United States Patent
Chen et al.

(10) Patent No.: US 12,042,859 B2
(45) Date of Patent: Jul. 23, 2024

(54) BUILD MATERIAL COMPOSITION

(71) Applicant: HEWLETT-PACKARD DEVELOPMENT COMPANY, L.P., Spring, TX (US)

(72) Inventors: Tienteh Chen, San Diego, CA (US); Vladek Kasperchik, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 273 days.

(21) Appl. No.: 16/605,123

(22) PCT Filed: Apr. 12, 2018

(86) PCT No.: PCT/US2018/027286
§ 371 (c)(1),
(2) Date: Oct. 14, 2019

(87) PCT Pub. No.: WO2019/177635
PCT Pub. Date: Sep. 19, 2019

(65) Prior Publication Data
US 2021/0139728 A1 May 13, 2021

Related U.S. Application Data

(63) Continuation-in-part of application No. PCT/US2018/022684, filed on Mar. 15, 2018.

(51) Int. Cl.
*B22F 1/10* (2022.01)
*B22F 1/05* (2022.01)
(Continued)

(52) U.S. Cl.
CPC ............... *B22F 1/10* (2022.01); *B22F 1/05* (2022.01); *B22F 1/102* (2022.01); *B22F 1/16* (2022.01);
(Continued)

(58) Field of Classification Search
CPC ......... B29C 64/165; B82Y 30/00; C08F 2/22; C08F 212/08; C08F 220/14; C08K 3/11; C09D 11/037; C09D 11/322; C09D 11/38
See application file for complete search history.

(56) References Cited

U.S. PATENT DOCUMENTS

| | | |
|---|---|---|
| 4,740,352 A | 4/1988 | Takahashi |
| 5,782,954 A | 7/1998 | Luk |

(Continued)

FOREIGN PATENT DOCUMENTS

| | | |
|---|---|---|
| CN | 102862295 | 1/2013 |
| CN | 104997643 A | 10/2015 |

(Continued)

OTHER PUBLICATIONS

Yun Bai et al. Effect of Bimodal Powder Mixture on Powder Packing Density and Sintered Density in Binder Jetting of Metals, p. 758-771, p. 764, table 2, Hallottexo B.

(Continued)

*Primary Examiner* — Samir Shah
*Assistant Examiner* — Dean Mazzola
(74) *Attorney, Agent, or Firm* — Dierker & Kavanaugh, P.C.

(57) ABSTRACT

An example of a composition includes a host metal present in an amount of at least about 90 wt % based on a total weight of the composition. A flow additive is also present in an amount of less than about 10 wt % based on the total weight of the composition. The flow additive consists of an organic particle having crosslinked polymer chains, a glass transition temperature ($T_g$) of at least 90° C., and a primary particle diameter of 100 nm or less.

17 Claims, 4 Drawing Sheets

(51) Int. Cl.

| | | |
|---|---|---|
| *B22F 1/102* | (2022.01) | |
| *B22F 1/16* | (2022.01) | |
| *B22F 10/10* | (2021.01) | |
| *B22F 10/14* | (2021.01) | |
| *B22F 10/73* | (2021.01) | |
| *B29C 64/165* | (2017.01) | |
| *B33Y 10/00* | (2015.01) | |
| *B33Y 40/10* | (2020.01) | |
| *B33Y 70/10* | (2020.01) | |
| *C08F 2/22* | (2006.01) | |
| *C08F 212/08* | (2006.01) | |
| *C08F 220/14* | (2006.01) | |
| *C08K 3/11* | (2018.01) | |
| *C09D 11/037* | (2014.01) | |
| *C09D 11/322* | (2014.01) | |
| *C09D 11/38* | (2014.01) | |
| *B22F 10/28* | (2021.01) | |
| *B82Y 30/00* | (2011.01) | |

(52) U.S. Cl.
CPC .............. *B22F 10/10* (2021.01); *B22F 10/14* (2021.01); *B22F 10/73* (2021.01); *B29C 64/165* (2017.08); *B33Y 10/00* (2014.12); *B33Y 40/10* (2020.01); *B33Y 70/10* (2020.01); *C08F 2/22* (2013.01); *C08F 212/08* (2013.01); *C08F 220/14* (2013.01); *C08K 3/11* (2018.01); *C09D 11/037* (2013.01); *C09D 11/322* (2013.01); *C09D 11/38* (2013.01); *B22F 10/28* (2021.01); *B22F 2304/10* (2013.01); *B22F 2998/10* (2013.01); *B82Y 30/00* (2013.01)

(56) References Cited

U.S. PATENT DOCUMENTS

| | | |
|---|---|---|
| 7,073,349 B2 | 7/2006 | Shekunov et al. |
| 7,258,720 B2 | 8/2007 | Fuwa et al. |
| 8,760,719 B2 | 6/2014 | Tyagi et al. |
| 8,992,659 B2 | 3/2015 | Larsson et al. |
| 9,176,405 B2 | 11/2015 | Nair et al. |
| 9,278,338 B2 | 3/2016 | Coupland |
| 9,421,612 B2 | 8/2016 | Fang et al. |
| 9,428,610 B2 | 8/2016 | Diekmann et al. |
| 2002/0178866 A1 | 12/2002 | Kawasaki |
| 2004/0009340 A1 | 1/2004 | Zhu et al. |
| 2004/0182202 A1 | 9/2004 | Geving et al. |
| 2005/0003189 A1 | 1/2005 | Bredt et al. |
| 2006/0051513 A1 | 3/2006 | Jackson et al. |
| 2006/0165910 A1 | 7/2006 | Kodas et al. |
| 2006/0229197 A1 | 10/2006 | Stark et al. |
| 2006/0251535 A1 | 11/2006 | Pfeifer et al. |
| 2007/0178163 A1 | 8/2007 | Kodas et al. |
| 2009/0136737 A1 | 5/2009 | Ring et al. |
| 2013/0143043 A1 | 6/2013 | Iwanaga et al. |
| 2014/0037338 A1 | 2/2014 | Tyagi et al. |
| 2015/0035209 A1 | 2/2015 | Shah et al. |
| 2015/0316868 A1 | 11/2015 | Ganapathiappan et al. |
| 2016/0002471 A1 | 1/2016 | Peng et al. |
| 2016/0200891 A1 | 7/2016 | Virgilio et al. |
| 2016/0333190 A1 | 11/2016 | Brule et al. |
| 2017/0189960 A1 | 7/2017 | Ibe |
| 2017/0326641 A1 | 11/2017 | Lee et al. |
| 2018/0044484 A1 | 2/2018 | Kalyanaraman |
| 2018/0194662 A1 | 7/2018 | Kim et al. |
| 2018/0369908 A1 | 12/2018 | Muto et al. |
| 2019/0016042 A1* | 1/2019 | Chisholm ............. C08F 212/08 |
| 2019/0062914 A1 | 2/2019 | King et al. |

FOREIGN PATENT DOCUMENTS

| | | | |
|---|---|---|---|
| EP | 1094909 | 12/2004 | |
| EP | 1252952 A3 | 7/2005 | |
| EP | 2221130 A1 | 8/2010 | |
| EP | 2446985 A1 | 5/2012 | |
| EP | 3187285 A1 | 7/2017 | |
| EP | 3260258 A1 | 12/2017 | |
| JP | 5905205 | 4/2016 | |
| JP | 2017127998 A | 7/2017 | |
| RU | 2000884 C1 | 10/1993 | |
| RU | 2333076 C1 | 9/2008 | |
| RU | 2489231 | 8/2013 | |
| WO | 99/59753 A1 | 11/1999 | |
| WO | WO-2002011929 A1 | 2/2002 | |
| WO | 2016/031279 A1 | 3/2016 | |
| WO | WO-2016065218 A1 * | 4/2016 | ......... C12N 15/1013 |
| WO | 2016/068899 A1 | 5/2016 | |
| WO | WO-2016119558 | 8/2016 | |
| WO | WO-2016181378 A2 | 11/2016 | |
| WO | WO-2017018985 | 2/2017 | |
| WO | WO-2017040893 A1 | 3/2017 | |
| WO | WO-2017040897 A1 | 3/2017 | |
| WO | 2017/059866 A2 | 4/2017 | |
| WO | 2017/077220 A1 | 5/2017 | |
| WO | WO-2017081160 A1 | 5/2017 | |
| WO | 2017/099250 A1 | 6/2017 | |
| WO | WO-2017096748 | 6/2017 | |
| WO | WO-2017109497 A1 * | 6/2017 | ........... B29C 64/153 |
| WO | WO-2017109703 A1 | 6/2017 | |
| WO | WO-2017112687 A1 | 6/2017 | |
| WO | WO-2017112689 A1 | 6/2017 | |
| WO | 2017/180314 A1 | 10/2017 | |
| WO | WO-2018017130 | 1/2018 | |
| WO | WO-2018026962 | 2/2018 | |
| WO | WO-2018031828 | 2/2018 | |
| WO | WO-20180119409 A1 | 6/2018 | |

OTHER PUBLICATIONS

Shikata, F., et al., "Real-time monitoring of granule properties during high shear wet granulation by near-infrared spectroscopy with chemometrics approach," 2017, Royal Society of Chemistry, vol. 7, pp. 38307-38317.

Berretta, S., et al., Size, Shape and Flow of Powders for Use in Selective Laser Sintering (SLS), 2013, University of Exeter, 6 pages.

Williams, et al. "Manufacturing cellular materials via three-dimensional printing of spray-dried metal oxide ceramic powder" (draft),GA Inst. of Technology,Jan. 2009, 10 pgs.

Modasiya, M.K., et al. "Design and Characterization of Fast Disintegrating Tablets of Piroxicam", Int.J. PharmTech (2009), vol. 1, No. 2, pp. 354-357.

Yeap, S. P. "Permanent agglomerates in powdered nanoparticles: formation and future prospects." 2018. Powder technology. 323. p. 51-59. (Year: 2018).

Anonymous: (A) Scanning electron microscopy (SEM) image of iron oxide . . . Download Scientific Diagram, online available at <https://www.researchgate.net/figure/A-Scanning-electron-microscopy-SEM-image-of-iron-oxide-nanoparticles-B-Field_fig2_337775798> Feb. 5, 2013, 13 pages.

Kumfer, B. M., et al., "Gas-phase flame synthesis and properties of magnetic iron oxide nanoparticles with reduced oxidation state," Journal of Aerosol Science, Sevier, Amsterdam, NL, vol. 41, No. 3, 2010, 15 pages.

Venables, H. et al. "Powder mixing", Drug Development and Industrial Pharmacy, vol. 27, No. 7, 2001, pp. 599-612.

Wikipedia, "Hausner ratio", XP93078417, Retrieved from the Internet Sep. 4, 2023: URL: https://en.wikipedia.org/wiki/Hausner_ratio, 1 page.

\* cited by examiner

BUILD MATERIAL COMPOSITION

CROSS-REFERENCE TO RELATED APPLICATIONS

This application claims priority to International Patent Application Number PCT/US2018/022684 filed Mar. 15, 2018, the contents of which is incorporated by reference herein in its entirety.

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

Inkjet printing has also been used to print liquid functional agents in some three-dimensional (3D) printing techniques. 3D printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material(s). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material to build the material together. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
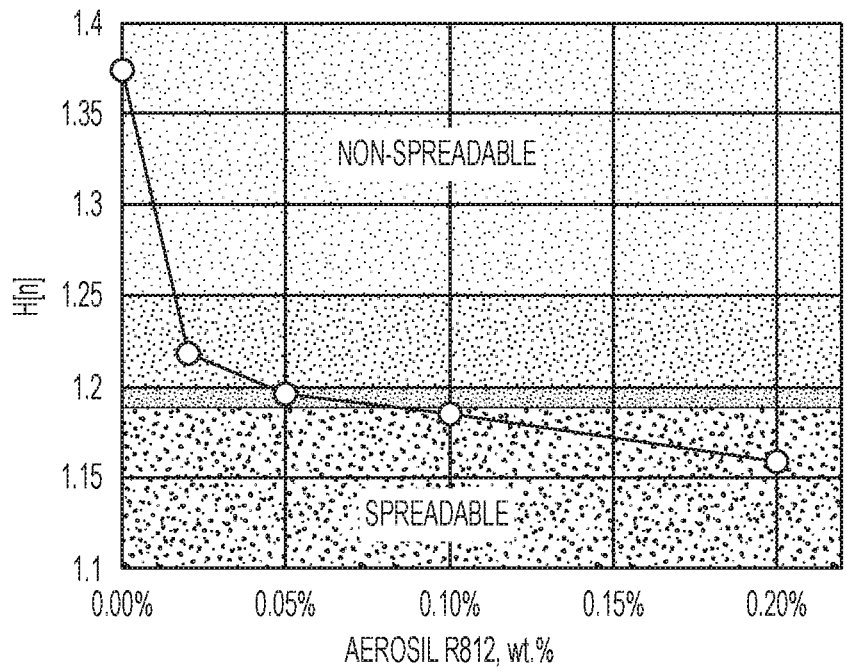
FIG. 1 depicts a graph of Hausner Ratio as a function of flow air weight percentage for a mixture of a comparative fumed silica flow aid in 316L stainless steel powder.

Some examples of the composition of the present disclosure may be used in a process to create a final metal object. For example, the process to create the final metal object may be a 3D printing process. In some examples, the 3D printing process may include subsequent patterning of uniformly spread layers of the composition with liquid binder applied by means of an inkjet printhead. Each patterned layer of the composition forms an individual cross-section of the final metal object. Stacking of the binder-patterned layers produces an intermediate part which can be extracted from the powderbed (or other build surface) after the patterning has been finished. The extracted intermediate part may be subjected to post-printing processing (e.g., heating via sintering), leading to consolidation of the particles of the composition into a mechanically stronger final metal object.

In other examples, the 3D printing process may include Selective Laser Melting (SLM). In these examples, uniformly spread layers of the composition are individually exposed to a laser beam of high energy density. The laser spot scans the spread metal powder surface, heats the metal particles, melts the metal particles and fuses the molten metal into continuous layers. During a SLM printing process, stacked fused layers (each layer representing a portion of the printed part) produce the final metal part (i.e., each subsequent laser-patterned layer is fused on top of the previous one). With SLM, the final metal part is produced without printing an intermediate part and without sintering the intermediate part. Therefore the sintering-related benefits associated with smaller particles size (i.e., diameter) are not applicable to SLM; however, the flow additives disclosed herein enable non-classified, lower cost metal powders with wide particle size distribution to be used with SLM.

Examples of the composition disclosed herein may be referred to as a build material composition, which may be used in a 3D printing kit, a 3D printing system, and a 3D printing method. While some of the examples provided herein relate to 3D printing, it is to be understood that the composition may also be used in other methods and applications.

As used herein, "material set" or "kit" is understood to be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material.

An example of the composition disclosed herein comprises a host metal present in an amount of at least 90 wt % based on a total weight of the composition; a flow additive present in an amount of less than 10 wt % based on the total weight of the composition, wherein the flow additive consists of an organic particle having crosslinked polymer chains, a glass transition temperature ($T_g$) of at least 90° C., and a primary particle diameter of 100 nm or less. In the examples disclosed herein, the composition is spreadable, having a Hausner Ratio less than 1.20.

In examples of the present disclosure, the composition is mainly the host metal. The host metal may be in powder form, i.e., particles. Sintering of the host metal particles usually happens below a melting temperature of the host metal. The sintering temperature of the host metal particles may be dependent, in part, on the size of the host metal particles. A host metal with a smaller average particle size will experience a faster sintering rate than a host metal having a larger average particle size. The rate of sintering of solid crystalline powders obeys Herring scaling law and is inversely proportional to the particle size by a power of between 2 and 4. Therefore, reducing a metal particle size may allow faster sintering at a lower sintering temperature. Both the speed of sintering and the sintering temperature may beneficially alter a structure of the sintered part. For example, a fast sintering rate at a lower temperature may prevent large grain growth. The prevention of large grain growth may improve ultimate tensile strength, yield strength, ductility and other mechanical properties of the final metal objects.

Thus, it may be desirable to use metal powders with the smallest particle size possible in 3D printing processes involving sintering. However, spreading of a powder into uniform thin layers of well-controlled thickness becomes increasingly difficult with decreased particle size. Without being held bound to any theory, it is believed that the reduced spreadability with decreasing particle size is due to inter-particle forces (i.e., van der Waals, electrostatic attraction, etc.) becoming significantly stronger than gravitational pull. Therefore, in general, powders become increasingly cohesive when a particle size of the powder is well below 100 µm. As such, smaller particles agglomerate together and the powders lose flowability. In the case of metals, even powders with spherical particles become non-spreadable into thin layers when the average particle size of the metal particles is within or below the range of about 12 µm to about 20 µm; especially when a fraction of particles present in the powder is within or smaller than the range of about 7 µm to about 10 µm. It is possible to remove the small particles from a metal powder by classification; however, classification is an additional process that adds to cost and removes the beneficial effects of small particles discussed above.

As mentioned above, examples of the composition disclosed herein include a flow additive in addition to the host metal. The flow additive disclosed herein is an organic material that is pyrolyzable at a pyrolysis temperature that is less than a sintering temperature of the host metal, and thus is unlike comparative flow additives that have been added to improve the flowability of difficult-to-spread cohesive metal powders with small particle sizes.

Examples of comparative flow additives include fumed oxide powders, which have been used to decrease the inter-particle cohesive forces in difficult-to-flow powders. It is believed that many, if not all, current commercially available comparative flow additives are based on different grades of fumed silica and, in some cases, fumed aluminum oxides. In some cases, precipitated colloidal silica powders have been used as comparative flow additives after surface modification.

These comparative flow additives are very low density powders made of loosely aggregated nano-particles. A typical particle size for the comparative flow additives ranges from about 1.5 to about 3 orders of magnitude smaller than the particle size of the cohesive powders to which the comparative flow additives are added. When added and mixed with cohesive host powders, these comparative flow additive nano-particles or their small aggregates stick to surfaces of the host particles. The host particle surfaces are coated with flow additive nano-spacers, thereby preventing agglomeration of the cohesive powder particles. Thus, formerly cohesive powders treated with an effective amount of the comparative flow additive (about 0.01 weight percent to 1.0 weight percent of the host powder) may be made flowable, with the potential of being spread in thin uniform layers. As used herein, better flowability of a composition means that the composition has better spreadability.

FIG. 1 depicts a graph of Hausner Ratio as a function of weight percentage for a mixture of a fumed silica flow aid in 316L stainless steel powder. The 316L stainless steel powder had an "as is" Hausner Ratio of about 1.37. Hausner Ratio ($H[n]$) is a powder flowability metric that can be measured by a tap density test. More specifically, the Hausner Ratio is a ratio of powder densities after and before compaction by tapping. A lower $H[n]$ correlates to better flowability. Metal powders with a spherical particle shape and a Hausner Ratio of less than or equal to about 1.20 may be suitable for 3D printing applications with. In some cases, suitable flowability may be found with a Hausner Ratio up to about 1.25. The function depicted in FIG. 1 was determined from laboratory test results. The stainless steel powder was SAE 316L, grade −22 µm (80%) powder from "Sandvik", (average particle diameter is approximately 11 µm). The fumed silica flow aid was Aerosil R812, available from Evonik.

It has been found that the comparative flow additives based on fumed oxides of silicon and aluminum discussed above cannot be used to improve flowability of metal powders used in certain additive manufacturing processes (e.g., those involving sintering) without negatively affecting strength-related structural properties of the final metal objects produced during the sintering process. Silica and alumina are not reduced during sintering processes with or without a reducing atmosphere. As such, both silica and alumina flow additive nano-particles become part of the structure of the final metal object. More particularly, the silica and alumina flow additive nano-particles get incorporated into grain boundary space of the final metal object structure. The presence of silica and/or alumina inclusions in a metal object structure diminishes the mechanical strength and ductility of the metal object. Thus, although comparative flow additives may improve flowability of certain metal powders, the comparative flow additives deleteriously affect mechanical properties of 3D objects formed therefrom. In the examples disclosed herein, the flow additives are organic particles that have a pyrolysis temperature that is less than a sintering temperature than the host metal. As such, the organic particles pyrolyze at a temperature that is less than the sintering temperature of the host metal, and thus, unlike the comparative flow additives, do not become part of the sintered, final metal object. Organic materials typically pyrolyze in a pyrolysis temperature range of about 300° C. to about 500° C.; while most industrial metals have a sintering temperature range above about 600° C. to about 800° C., or higher. Many industrial metals (e.g., many ferrous metals, such as steels) sinter close to or well above 1000° C.

Figure 2:
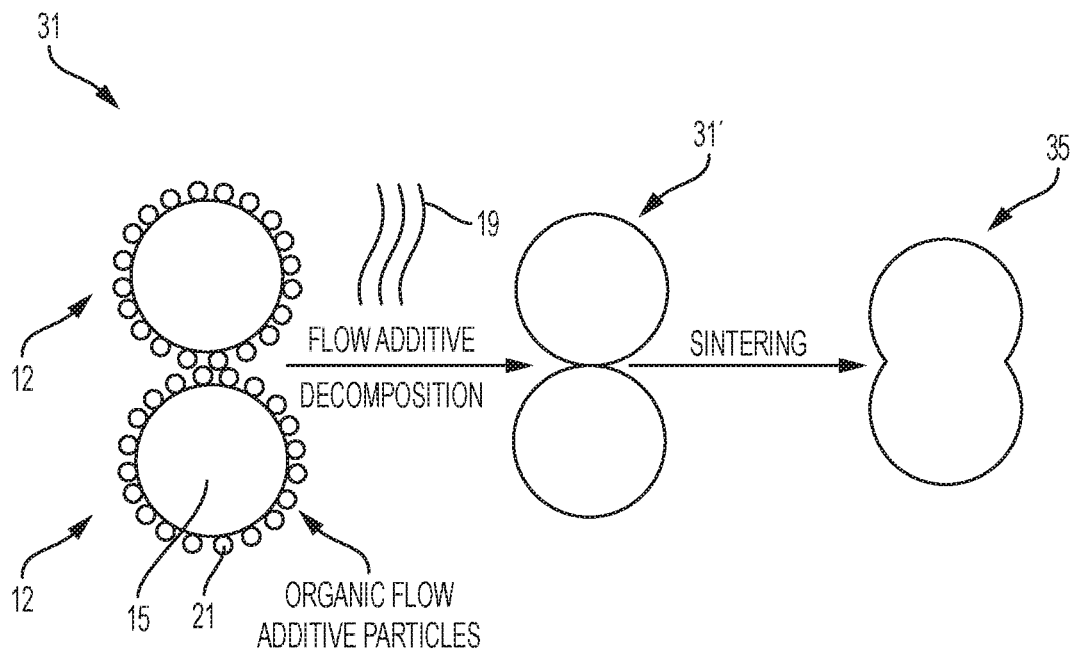
FIG. 2 is a schematic diagram depicting effects of processing on examples of the composition disclosed herein.

FIG. 2 is a diagram depicting the composition (also referred to herein as a build material composition 12) of the present disclosure going through certain processes of an example of an additive manufacturing process. FIG. 2 begins with a portion of an intermediate part 31, which includes the build material composition 12 (host metal 15 and flow additive 21) patterned with a binder agent (not shown). During initial heating stages after patterning, the example flow aid 21 pyrolyzes, and thus decomposes, and is removed from the intermediate part 31. The vapor cloud 19 shown in FIG. 2 represents the flow additive 21 being removed from the build material composition 12 by pyrolysis. The remaining intermediate part 31' is then sintered to form the final 3D object or part 35.

Some examples of the composition/build material composition 12 disclosed herein include the host metal 15 and the flow additive 21. In some examples, the build material composition 12 includes particles of the host metal 15 and particles of the flow additive 21. In the present disclosure, the term "particles" means discrete solid pieces of components of the build material composition 12. As used herein, the term "particles" does not convey a limitation on the shape of the particles. As examples, particles may be spherical beads or irregularly shaped beads of lower aspect ratio. The size or diameter may be the diameter of a spherical particle, or the average of several diameters across a non-spherical particle. The size or diameter may be the volume weighted mean diameter.

In examples, the host metal 15 is present (in the build material composition 12) in an amount of at least about 90% based on a total weight of the build material composition 12. In a specific example, the host metal 15 is present (in the build material composition 12) in an amount ranging from about 95 wt % to about 99.99 wt %, based on a total weight of the build material composition 12. In other examples, the host metal 15 may be present in an amount ranging from about 98 wt % to about 99.99 wt %, based on a total weight of the build material composition 12. In still other examples, the host metal 15 may be present in an amount ranging from about 99.50 wt % to about 99.99 wt % based on a total weight of the build material composition 12.

The flow additive 21 substantially makes up the remaining portion of the build material composition 12. "Substantially makes up the remaining portion" means that trace amounts of other materials may be present in the build material composition 12, whether intentionally or unintentionally. For example, dust or microbes may be found in the build material composition 12 in amounts that are too small to significantly alter the material properties of the build material composition 12. Therefore, the weight percent of the host metal 15, and the weight percent of the flow additive 21 add to yield about 100 weight percent of the build material composition 12.

In examples, the flow additive 21 is present in an amount of less than about 10 wt % based on a total weight of the build material composition 12. In a specific example, the flow additive 21 is present in an amount ranging from about 0.01 wt % to about 5 wt % based on the total weight of the build material composition 12. In other examples, the flow additive 21 may be present in an amount ranging from about 0.01 wt % to about 2 wt % based on the total weight of the build material composition 12. In still other examples, the flow additive 21 may be present in an amount ranging from about 0.01 wt % to about 0.50 wt % or from about 0.05 wt % to about 0.1 wt % based on the total weight of the build material composition 12.

The host metal 15 may be a single phase metallic material composed of one element. In this example, the sintering temperature of the build material composition 12 may be below the melting point of the single element. In another example, the host metal 15 is composed of two or more elements, which may be in the form of a single phase metallic alloy or a multiple phase metallic alloy. In these other examples, sintering generally occurs over a range of temperatures.

The host metal 15 may be composed of a single element or alloys. Some examples of the host metal 15 include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, SS 430L, Ti6Al4V, and Ti-6Al-4V ELI7. While several example alloys have been provided, it is to be understood that other alloys may be used.

In some examples, the particles of the host metal 15 may have an average host metal particle size less than 20 μm. In some examples, some host metal particles in a mixture of host metal particles may be as small as about 1 μm.

The flow additive 21 is an organic particle having crosslinked polymer chains, a glass transition temperature ($T_g$) of at least 90° C., and a particle diameter (i.e., size) of 100 nm or less. When the organic particles are spherical, the particles may also have a radius of 50 nm or less). It has been found that the organic particles disclosed herein do not begin to melt when exposed to temperatures up to about 200° C. (i.e., temperatures used in the powderbed, platform, or other build surface of the 3D printer). Because the organic particles do not melt when exposed to these lower 3D printing temperatures, the organic particles remain intact as discrete particles in the powderbed. As such, the organic particles do not function as an adhesive that would facilitate agglomeration of the host metal 15 (i.e., they do not melt and adhere to the surrounding host metal 15). The stability of the organic particles at the lower 3D printing temperatures can aid in intermediate part removal from the powderbed and can also improve the build material's recyclability. For example, because the non-patterned flow additive 21 does not even loosely adhere to the patterned intermediate part 31 in the powderbed, the patterned intermediate part 31 (which is bound by the binder applied thereto) can easily be removed from the non-patterned portions. For another example, because the non-patterned flow additive 21 does not agglomerate as a result of low temperature melting, the non-patterned flow additive 21 remains spreadable, and thus can be recycled with the non-patterned host metal 15.

It has been found that the flow additive 21 disclosed herein, which does not melt at the lower 3D printing temperatures and thus does not act as an adhesive at the lower 3D printing temperatures, consists of an organic particle having a relatively high glass transition temperature ($T_g$) (at least 90° C.), crosslinked polymer chains, and a primary particle diameter of 100 nm of less. The surface of the organic particle may also be relatively hydrophobic.

The organic particle has a glass transition temperature of at least 90° C. This glass transition temperature is above the spread temperature (i.e., the temperature to which the build material composition 12 is exposed when it is spread during a 3D printing or other process). By having a glass transition temperature that is above the spread temperature, the organic particle does not soften or melt, and thus does not function as an adhesive or deleteriously affect the flowability-improving properties of the flow additive 21. In some examples, the glass transition temperature is at least 100° C.

The organic particle also has crosslinked polymer chains. Within an individual organic particle, the polymer chains are crosslinked to form a three-dimensional matrix, which reduces the polymer chain mobility and creates a gel-like particle. As used herein, "crosslinked polymer chains" refers to a polymer and/or a polymer mixture which can be self-crosslinked, by reaction of different functional groups in the same molecular chain, or inter-crosslinked by reaction with another compound which has a different functional group. The self- or inter-crosslinking may be covalent crosslinking. In an example, the organic particle has a degree of crosslinking (or crosslinking density) of at least 2%. In other words, at least 2% of the functional groups of the polymer chains are covalently interconnected. It is to be understood that the degree of crosslinking may be higher. A degree of crosslinking of 2% or more contributes to the organic particle's ability to remain intact (i.e., not soften or melt) when exposed to the lower 3D printing temperatures described herein.

The organic particle also has a primary particle diameter of 100 nm or less. As such, the particles of the flow additive may have an average flow additive primary particle diameter ranging from about 1 to about 3 orders of magnitude smaller than an average host metal particle diameter. In some examples, the average flow additive primary particle diameter ranges from about 5 nm to about 100 nm, and in another example, the average flow additive primary particle diameter ranges from about 5 nm to about 60 nm.

It is to be understood that when initially formed, the organic particles may be in the form of highly structured agglomerates with a relatively low density (e.g., 0.5% to 20% of a bulk density of the material forming the flow additive 21). For example, the highly structured agglomerates of the organic particles may have an agglomerate size ranging from a few μm to about 300 μm. The agglomerates are composed from primary organic particles having a primary particle diameter and size in the nano-range, as mentioned herein. In a container of the flow additive 21, the primary organic particles may be encountered as low density, often fractal structures (i.e., agglomerates). When the flow additive agglomerates are mixed with a carrier powder (e.g., the host metal 15 disclosed herein), the flow additive agglomerates break down into either the individual primary organic particles or small fragments containing a few primary organic particles. The small fragments and individual primary organic particles stick to a surface of the host metal 15 particles and improve flowability of the host metal 15.

Moreover, the organic particle may be hydrophobic. Without being held bound to any theory, it is believed that a hydrophilic flow additive may be plasticized by water (e.g., moisture from the surrounding environment) with a corresponding reduction in the glass transition temperature. Hydrophilic flow additives may induce stickiness into the build material composition 12. Highly hydrophilic, i.e., water-plasticizeable flow additive particles may turn into "sticky" adhesive particles upon atmospheric water vapor absorption. A sticky build material composition 12 will have a higher Hausner Ratio than a build material composition 12 that is not sticky. Therefore, a hydrophilic flow additive (such as water-dispersible polyurethane particles) in the build material composition 12 may cause the build material composition 12 to be less spreadable than the examples of the build material composition 12 disclosed herein, which include a hydrophobic flow additive. However, under special conditions where the flow additive 21 and the build material composition 12 are not exposed to a high humidity environment during storage or 3D printing, some amount of surface hydrophilicity in the flow additive 21 may be acceptable with little degradation in the performance properties of the flow additive 21.

In examples, the organic particle flow additive 21 is also selected so that it undergoes pyrolysis at a temperature below the sintering temperature of the host metal 15. It may be desirable for the flow additive decomposition to yield volatile decomposition products. In examples, the volatile decomposition products are at least about 40 percent of a pre-pyrolyzed weight of the flow additive 21. In other examples, the volatile decomposition products are at least about 70 percent of a pre-pyrolyzed weight of the flow additive 21. In still other examples, the volatile decomposition products are at least about 90 percent of a pre-pyrolyzed weight of the flow additive. In examples, the volatile decomposition products of the pyrolysis of the flow additive 21 may be a gaseous byproduct. Gaseous byproduct(s) may be removed using a flowing purge gas or some other suitable gas removal mechanism.

The flow additive decomposition may also yield, in some instances, a non-volatile carbon-rich product. As used herein, a carbon-rich product means a residue, char, or other decomposition product that is at least 50 percent carbon by weight. Presence of the carbon-rich decomposition product may slow the sintering process, but not significantly. In some instances then, it may be desirable to remove the non-volatile carbon-rich product. The non-volatile carbon-rich product can be converted into volatile hydrocarbons during sintering in a hydrogen-rich atmosphere. The volatile hydrocarbons may be gaseous and removed using a suitable gas removal mechanism.

In some examples, the carbon-rich product may be removed as follows: oxygen from the surrounding gas, or oxygen from a metal oxide that coats a surface of the host metal 15 particles, combines with the carbon to form CO or $CO_2$ gas. It should be noted that once the oxygen is depleted (either from the surrounding gas or the surface oxide) any carbon that has not been removed will remain in the part. The surface oxide reduction described above is active for some metals (Fe, Co, Cr, Ni) and not others (Ti).

In some examples, the crosslinked polymer chains of the organic particle are formed of a hydrophobic monomer having a glass transition temperature ($T_g$) of equal to or greater than 90° (i.e., at least 90° C.) and water solubility lower than 0.1%, and a multi-functional crosslinking monomer. In these examples, no other monomers are used. In these examples, the organic particle includes from about 80 wt % to about 98 wt % of the hydrophobic monomer, based on a total weight of the organic particle, and from about 2 wt % to about 20 wt % of the multi-functional crosslinking monomer, based on the total weight of the organic particle.

Any suitable hydrophobic monomer having a glass transition temperature ($T_g$) of equal to or greater than 90° (i.e., at least 90° C.) and a water solubility lower than 0.1% may be used. The glass transition temperature of the hydrophobic monomer may be higher, for examples, at least 100° C., or at least 120° C. A water solubility of lower than 0.1% means that less than 1 g of the monomer will dissolve in 1000 mL of water. The water solubility of the hydrophobic monomer may also be lower. Some examples of suitable hydrophobic monomers and the corresponding structure and glass transition temperatures are shown in Table 1. While several examples are provided, it is to be understood that other hydrophobic monomers with the suitable glass transition temperature and water solubility may also be used.

TABLE 1

| Hydrophobic Monomer | Structure | $T_g$ (C.) |
|---|---|---|
| Isobornyl Methacrylate | | 150 |
| Isobornyl Acrylate | | 96 |
| tert-Butyl methacrylate | | 117 |
| tert-Butyl Arylamide | | 128 |
| tert-Butyl Metharylamide | | 160 |
| N-phenylacrylamide | | 200 |
| N-Benzyl-Methacrylamide | | 220 |
| N-tert-Octylacrylamide | | >150 |
| Cyclohexyl methacrylate | | 90 |

TABLE 1-continued

| Hydrophobic Monomer | Structure | $T_g$ (C.) |
|---|---|---|
| 4-tert-butylcyclohexyl methacrylate | | 120-130 |
| Benzhydryl methacrylate | | >150 C. |
| Methyl methacrylate | | 105 |
| Phenyl methacrylate | | 110 |
| Dihydrodicyclopentadienyl Acrylate | | 110 |
| 4-tert-Butylstyrene | | 127 |
| 2,6-Dichlorostyrene | | 167 |
| 2,5-Dimethylstyrene | | 143 |
| 4-Methylstyrene | | 97 |

TABLE 1-continued

| Hydrophobic Monomer | Structure | $T_g$ (C.) |
|---|---|---|
| 3-Methylstyrene | | 97 |
| Styrene | | 100 |
| 2,4,6-Trimethylstyrene | | 162 |
| 4-Acetoxystyrene | | 116 |

The multi-functional crosslinking monomer is a monomer that contains two or more polymerizable or reactive functional groups. Some examples of suitable multi-functional crosslinking monomers and the corresponding number of polymerizable or reactive functional groups are shown in Table 2. While several examples are provided, it is to be understood that other multi-functional crosslinking monomers with two or more polymerizable or reactive groups may also be used.

TABLE 2

| Multi-functional crosslinking monomer | Functional Groups |
|---|---|
| Ethylene glycol dimethacrylate | 2 |
| Ethylene glycol diacrylate | 2 |
| Diethylene glycol dimethacrylate | 2 |
| Diethylene glycol diacrylate | 2 |
| 1,4-Butanediol diacrylate | 2 |
| 1,3-Butanediol dimethacrylate | 2 |
| 1,4-Butanediol dimethacrylate | 2 |
| 1,6-Hexanediol diacrylate | 2 |
| 1,6-Hexanediol dimethacrylate | 2 |
| N,N'-Hexamethylenebisacrylamide | 2 |
| Triethylene glycol dimethacrylate | 2 |
| Zinc (di)methacrylate | 2 |
| Pentaerythritol tetraacrylate | 4 |
| Pentaerythritol triacrylate | 3 |
| N,N'-Ethylene Bisacrylamide | 2 |
| N,N'-Methylenebisacrylamide | 2 |
| 1,4-Divinylbenzene | 2 |
| 1,3-Divinylbenzene | 2 |

In examples of the organic polymer that include the hydrophobic monomer and the multi-functional crosslinking monomer, the hydrophobic monomer is selected from the group consisting of isobornyl methacrylate, isobornyl acrylate, tert-butyl methacrylate, tert-butyl acrylamide, tert-butyl methacrylamide, N-phenylacrylamide, N-benzyl-methacrylamide, N-tert-octylacrylamide, cyclohexylmethacrylate, 4-tert-butylcyclohexyl methacrylate, benzhydryl methacrylate, methyl methacrylate, phenyl methacrylate, dihydrodicyclopentadienyl acrylate, 4-tert-butylstyrene, 2,6-dichlorostyrene, 2,5-dimethylstyrene, 4-methylstyrene, 3-methylstyrene, styrene, 2,4,6-trimethylstyrene, 4-acetoxystyrene, and combinations thereof; and the multi-functional crosslinking monomer is selected from the group consisting of ethylene glycol dimethacrylate, ethylene glycol diacrylate, diethylene glycol dimethacrylate, diethylene glycol diacrylate, 1,4-butanediol diacrylate, 1,3-butanediol dimethacrylate, 1,4-butanediol dimethacrylate, 1,6-hexanediol diacrylate, 1,6-hexanediol dimethacrylate, N—N'-hexamethylenebisacrylamide, triethylene glycol dimethacrylate, zinc methacrylate, pentaerythritol tetraacrylate, pentaerythritol triacrylate, N—N'-ethylenebisacrylamide, N—N'-methylenebisacrylamide, 1,4-divinylbenzene, 1,3-divinylbenzene, and combinations thereof.

In other examples, the crosslinked polymer chains of the organic particle are formed of the hydrophobic monomer and the multi-functional crosslinking monomer (as described herein), and are further formed of an acidic monomer selected from the group consisting of 2-acrylamido-2-methy-1-propanesulfonic acid, methacrylic acid, and combinations thereof. Acidic monomers are monomers containing acidic functional group(s), such as sulfonic acid or carboxylic acid. These monomers may be used to form the organic particle when it is desirable to reduce the primary particle diameter of the particle and/or to render the organic particle more stable in water. In these examples, the organic particle includes from about 55 wt % to about 95 wt % of the hydrophobic monomer, from about 5 wt % to about 40 wt % of the multi-functional crosslinking monomer, and up to about 10 wt % of the acidic monomer, all of which are based on a total weight of the organic particle.

In examples of the organic polymer that include the hydrophobic monomer the multi-functional crosslinking monomer, and the acidic monomer, the hydrophobic monomer is selected from the group consisting of isobornyl methacrylate, isobornyl acrylate, tert-butyl methacrylate, tert-butyl acrylamide, tert-butyl methacrylamide, N-phenylacrylamide, N-benzyl-methacrylamide, N-tert-octylacrylamide, cyclohexylmethacrylate, 4-tert-butylcyclohexyl methacrylate, benzhydryl methacrylate, methyl methacrylate, phenyl methacrylate, dihydrodicyclopentadienyl acrylate, 4-tert-butylstyrene, 2,6-dichlorostyrene, 2,5-dimethylstyrene, 4-methylstyrene, 3-methylstyrene, styrene, 2,4,6-trimethylstyrene, 4-acetoxystyrene, and combinations thereof; the multi-functional crosslinking monomer is selected from the group consisting of ethylene glycol dimethacrylate, ethylene glycol diacrylate, diethylene glycol dimethacrylate, diethylene glycol diacrylate, 1,4-butanediol diacrylate, 1,3-butanediol dimethacrylate, 1,4-butanediol dimethacrylate, 1,6-hexanediol diacrylate, 1,6-hexanediol dimethacrylate, N—N'-hexamethylenebisacrylamide, triethylene glycol dimethacrylate, zinc methacrylate, pentaerythritol tetraacrylate, pentaerythritol triacrylate, N—N'-ethylenebisacrylamide, N—N'-methylenebisacrylamide, 1,4-divinylbenzene, 1,3-divinylbenzene, and combinations thereof; and the acidic monomer is selected from the group consisting of 2-acrylamido-2-methy-1-propanesulfonic acid, methacrylic acid, and combinations thereof.

In still other examples, the crosslinked polymer chains of the organic particle are formed of the hydrophobic monomer and the multi-functional crosslinking monomer (as previously described), and are further formed of a low $T_g$ monomer having a $T_g$ less than 90° C. These monomers may be used to reduce the hydrocarbon residue during sintering. Examples of suitable low $T_g$ monomers include n-butyl acrylate, n-butyl methacrylate, 2-ethylhexyl acrylate, ethyl acrylate, n-propyl acrylate, benzyl acrylate, and combinations thereof. In these examples, the organic particle includes from about 55 wt % to about 95 wt % of the hydrophobic monomer, from about 5 wt % to about 40 wt % of the multi-functional crosslinking monomer, and up to about 10 wt % of the low $T_g$ monomer, all of which are based on a total weight of the organic particle. It is to be understood that the amount of the low $T_g$ monomer does not lower the overall $T_g$ of the organic particle below 90° C.

In examples of the organic polymer that include the hydrophobic monomer the multi-functional crosslinking monomer, and the low $T_g$ monomer, the hydrophobic monomer is selected from the group consisting of isobornyl methacrylate, isobornyl acrylate, tert-butyl methacrylate, tert-butyl acrylamide, tert-butyl methacrylamide, N-phenylacrylamide, N-benzyl-methacrylamide, N-tert-octylacrylamide, cyclohexylmethacrylate, 4-tert-butylcyclohexyl methacrylate, benzhydryl methacrylate, methyl methacrylate, phenyl methacrylate, dihydrodicyclopentadienyl acrylate, 4-tert-butylstyrene, 2,6-dichlorostyrene, 2,5-dimethylstyrene, 4-methylstyrene, 3-methylstyrene, styrene, 2,4,6-trimethylstyrene, 4-acetoxystyrene, and combinations thereof; the multi-functional crosslinking monomer is selected from the group consisting of ethylene glycol dimethacrylate, ethylene glycol diacrylate, diethylene glycol dimethacrylate, diethylene glycol diacrylate, 1,4-butanediol diacrylate, 1,3-butanediol dimethacrylate, 1,4-butanediol dimethacrylate, 1,6-hexanediol diacrylate, 1,6-hexanediol dimethacrylate, N—N'-hexamethylenebisacrylamide, triethylene glycol dimethacrylate, zinc methacrylate, pentaerythritol tetraacrylate, pentaerythritol triacrylate, N—N'-ethylenebisacrylamide, N—N'-methylenebisacrylamide, 1,4-divinylbenzene, 1,3-divinylbenzene, and combinations thereof; and the low $T_g$ monomer is selected from the group consisting of n-butyl acrylate, n-butyl methacrylate, 2-ethylhexyl acrylate, ethyl acrylate, n-propyl acrylate, benzyl acrylate, and combinations thereof.

Any of the organic particles disclosed herein may also include some initiator and/or surfactant, which may be used during synthesis of the organic particles. The surfactant may be absorbed on the surface of the organic particle after synthesis is complete. Once synthesized, the organic particles may be mixed with the host metal 15 as the flow additive 21 in order to form the build material composition 12.

Figure 3:
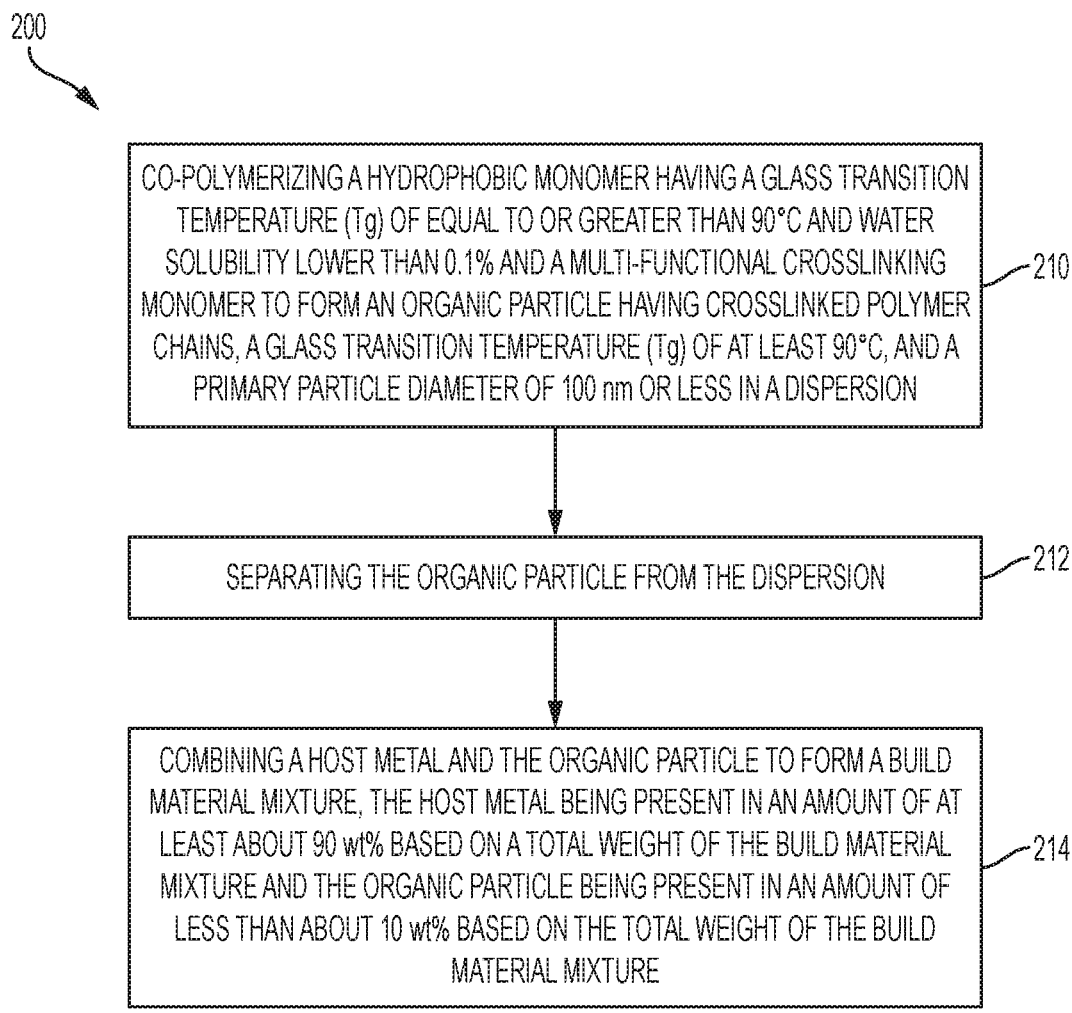
FIG. 3 is a flow diagram depicting an example of a method for making a build material composition according to the present disclosure.

Referring now to FIG. 3, a flow diagram 200 depicts an example of a method for making the build material composition 12 according to the present disclosure. As depicted, the method 200 includes co-polymerizing a hydrophobic monomer having a glass transition temperature ($T_g$) of equal to or greater than 90° C. and water solubility lower than 0.1% and a multi-functional crosslinking monomer to form an organic particle having crosslinked polymer chains, a $T_g$ of at least 90° C., and a primary particle diameter of 100 nm or less in a dispersion (reference numeral 210); separating the organic particle from the dispersion (reference numeral 212); and combining a host metal 15 and the organic particle to form a build material mixture 12, the host metal 15 being present in an amount of at least about 90 wt % based on a total weight of the build material mixture and the organic particle being present in an amount of less than about 10 wt % based on the total weight of the build material mixture 12 (reference numeral 214).

The co-polymerization of the monomers to form the organic particles (reference numeral 212) may be accomplished using any suitable technique, such as emulsion polymerization (e.g., micro-emulsion or mini-emulsion polymerization). As mentioned above, in addition to the suitable monomers, the initiator and/or the surfactant may be used in the synthesis of the organic particles. Suitable initiators include thermal initiators (e.g., persulfate, peroxide, azo initiators, etc.) or redox initiators (e.g., persulfate-bisulfite, Fenton's reagent, peroxide-bisulfite Cu(II)-bisulfite, etc.). The initiator may be used in an amount ranging from about 0.2 wt % to about 2 wt % based a total weight of the monomers. Suitable surfactants include alkyl sulfate, alkyl sulfonate, aralkylsulfate, aralkylsulfonate, aralkylsulfonate with polymerizable functional group(s), aralkylsulfate with polymerizable functional group(s), and/or aqueous polyurethane dispersions. Examples of suitable surfactants include sodium alkyl sulfates, such as sodium dodecylsulfate or sodium lauryl sulfate.

In an example of the method 200, prior to performing the co-polymerization, the method 200 further comprises combining the hydrophobic monomer and the multi-functional monomer in a mixture including water, an initiator, and a surfactant. It is to be understood that the monomer mixture and the initiator may be added at all at once, or at predetermined periods throughout the co-polymerization process. In an example using emulsion polymerization, an aqueous solution may be prepared containing from about 1 wt % to about 10 wt % of the surfactant based on the total weight of the monomers. In another example, the amount of surfactant may range from about 1 wt % to about 2 wt % based on the total weight of the monomers. Suitable amounts of the hydrophobic monomer and the multi-functional crosslinking monomer, alone or in combination with the acidic monomer or the low $T_g$ monomer, may be mixed together. A portion of the monomer mixture may be added to the aqueous surfactant solution to form an emulsion. The initiator may then be added to initiate the polymerization. The remaining monomer mixture may be added over a predetermined time period, along with intermittent additions of the initiator. The polymerization may continue for a suitable time after the entire monomer mixture is added. This process forms an aqueous dispersion of the organic particles. In a mini-emulsion polymerization, the monomers, surfactant, and initiator are mixed enough to form a monomer emulsion. The monomer emulsion is then added to a reactor and mixed for a time sufficient to polymerize. The mini-emulsion polymerization process may result in larger sized organic particles.

In the examples disclosed herein, the organic particle is separated from the dispersion (reference numeral 212). The separation may involve freezing and lyophilization (i.e., freeze drying). The aqueous dispersion of the organic particles may be rapidly frozen and then lyophilized (i.e., freeze dried). Freezing may take place at any suitable freezing temperature. Lower freezing temperatures may speed up the process, which can lead to organic particles with the desirable shape, etc. In an example, freezing may be at or below 0° C., and in another example, freezing may be at or below −17° C. Lyophilization may take place in a vacuum chamber at temperatures starting as low as about −40° C. to about −50° C. The temperature may vary throughout the process, and may be slowly ramped up as water is removed. The less residual water that remains, the higher the drying temperature may be. The freeze drying may prevent the primary particles of the organic particle flow additive 21 from forming hard, difficult to break, agglomerates. The rapid freezing of the aqueous dispersion of the organic particles freezes the structure of the organic particle (which has a primary particle diameter of 100 nm or less). The removal of the frozen liquid via sublimation (during freeze drying) prevents the organic particles from compacting into hard agglomerates as a result of capillary action. Rather, as a result of lyophilization, the primary organic particles form low density, fractal structures that are easily broken when mixed with the host metal 15.

In the examples disclosed herein, the separated organic particle is then combined with the host metal 15 (reference numeral 214). Any suitable conditions may be used to mix the host metal 15 with the organic particle flow additive 21. The Hausner Ratio may be tested periodically throughout the mixing process to determine when the desirable Hausner ratio has been obtained. In an example, simple mixing of the host metal 15 with the organic particle flow additive 21 in a rotating container for about 1 hour to about 2 hours may be sufficient mixing to obtain a uniform Hausner Ratio throughout the mixture. Very long mixing, (e.g., 2 days or more) may result in flowability degradation (i.e., an increase in the Hausner Ratio over the Hausner Ratio that is achieved by an amount of mixing that has a duration at a threshold of sufficiency to be effective). During mixing, the flow additive agglomerates break down into either the individual primary organic particles or small fragments containing a few primary organic particles. The small fragments and individual primary organic particles stick to a surface of the host metal 15 particles and improve flowability of the host metal 15.

Some examples of the components that can be used in combination to form the organic particles (OP) are shown in Table 3. While several examples are provided, it is to be understood that other combinations of the hydrophobic monomer(s), the multi-functional crosslinking monomer(s), with or without the acidic monomer(s) or the low $T_g$ monomer(s) may also be used. In Table 3, the hydrophobic monomers include: Isobornyl Methacrylate (IBMA), tert-Butyl Methacrylate (TBMA) and/or Methyl Methacrylate (MMA); the multi-functional monomers include: Ethyleneglycol Dimethacrylate (EGDM) and/or Divinylbenzene (DVB); the acidic monomers include 2-acrylamido-2-methy-1-propanesulfonic acid (AMPS) and/or Methacrylic Acid (MAA); the initiator is Sodium Persulfate (NaPS) or 4,4'-Azobis(4-cyanovaleric acid) (ACVA); and the surfactant is sodium dodecylsulfate (SDS). The Tg of the organic particle is also shown. The Tg may vary slightly depending upon the method used to measure it. Tg can be measured experimentally by differential scanning calorimetry or it can be calculated using the Fox equation:

$$1/Tg_{co} = Wf_1/Tg_1 + Wd_2/Tg_2 + Wf_x/Tg_x$$

where $Tg_{co}$=Tg of copolymer, $Wf_x$=weight fraction of monomer x, $Tg_x$=Tg of a polymer made from monomer x.

TABLE 3

| OP ID | Hydrophobic Monomers (wt %) | | | | Multi-functional Monomers | | Acidic Monomers | | Init | $T_g$ (C.) | Surf |
|---|---|---|---|---|---|---|---|---|---|---|---|
| | IBMA | TBMA | MMA | Styrene | EGDM | DVB | AMPS | MAA | | | |
| 1 | — | — | — | 90 | 10 | — | — | — | NaPS | 100 | SDS |
| 2 | — | — | 90 | — | 10 | — | — | — | NaPS | 100 | SDS |
| 3 | 50 | — | 40 | — | 10 | — | — | — | NaPS | 126 | SDS |
| 4 | 90 | — | — | — | 10 | — | — | — | NaPS | 150 | SDS |
| 5 | 85 | — | — | — | 15 | — | — | — | NaPS | 150 | SDS |
| 6 | 80 | — | — | — | 20 | — | — | — | NaPS | 150 | SDS |
| 7 | 20 | 70 | — | — | — | 10 | — | — | NaPS | 114 | SDS |
| 8 | 50 | 40 | — | — | — | 10 | — | — | NaPS | 126 | SDS |
| 9 | 90 | — | — | — | 10 | — | — | — | V-50 | 150 | SDS |
| 10 | 90 | — | — | — | 10 | — | — | — | ACVA | 150 | SDS |
| 11 | 87 | — | — | — | 10 | — | — | 3 | ACVA | 150 | SDS |
| 12 | 50 | 37 | — | — | 10 | — | — | 3 | ACVA | 125 | SDS |
| 13 | 87 | — | — | — | 10 | — | 3 | — | ACVA | 150 | SDS |
| 14 | 50 | — | — | 37 | — | 10 | — | 3 | ACVA | 125 | SDS |
| 15 | 50 | — | — | 40 | — | 10 | — | — | ACVA | 125 | SDS |
| 16 | 20 | 67 | — | — | — | 10 | — | 3 | ACVA | 114 | SDS |
| 17 | 50 | 37 | — | — | — | 10 | — | 3 | ACVA | 126 | SDS |
| 18 | 77 | — | — | — | 20 | — | — | 3 | NaPS | 150 | SDS |
| 19 | 67 | — | — | — | 30 | — | — | 3 | NaPS | 150 | SDS |
| 20 | 57 | — | — | — | 40 | — | — | 3 | ACVA | 150 | SDS |

As mentioned herein, the build material composition 12 includes the host metal 15 and the flow additive 21 (i.e., any example of the organic particle disclosed herein). In examples, the Hausner Ratio may be less than or equal to 1.20. The Hausner Ratio is determined at a spread temperature of the build material composition 12. The spread temperature for the build material composition 12 is the temperature to which the build material composition 12 is exposed when it is to be spread as a layer. For example, the build material composition 12 may be spread at 25° C., 200° C., or at any other suitable spread temperature (including those temperatures between 25° C. and 200° C.). The relevant Hausner Ratio for the build material composition 12 of the present disclosure is the Hausner Ratio at the spread temperature of the composition/build material composition 12. As stated above, better flowability of the build material composition 12 means that the build material composition 12 has better spreadability.

Some processes that use the composition/build material composition 12 of the present disclosure to make metal objects may include spreading a thin layer of the build material composition 12 for subsequent processing. For example, in a 3D printing process, the build material composition 12 may be spread one layer upon another layer, with each layer patterned by a functional agent prior to the addition of the next layer. (See FIG. 5.) The functional agent may be a binder agent 14. Together, the build material composition 12 and the binder agent 14 to be selectively applied thereto may be referred to as a three-dimensional (3D) printing kit, which will be described more in reference to FIG. 4.

Figure 4:
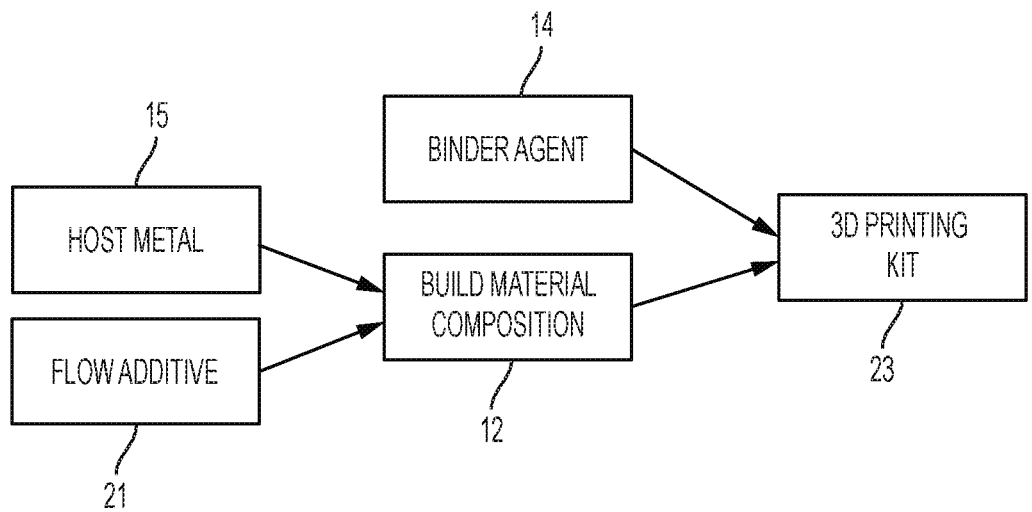
FIG. 4 is a block diagram that depicts components of a build material composition and a three-dimensional (3D) printing kit as disclosed herein.

FIG. 4 is a block diagram that shows components of the build material composition 12 and the 3D printing kit 23 as disclosed herein. As mentioned, the build material composition 12 includes both the host metal 15 and the flow additive 21. In an example, the kit 23 for three-dimensional (3D) printing, comprises: a build material composition 12 including: a host metal 15 present in an amount of at least about 90 wt % based on a total weight of the build material composition; and a flow additive 21 present in an amount of less than about 10 wt % based on the total weight of the build material composition, wherein the flow additive consists of an organic particle having crosslinked polymer chains, a glass transition temperature ($T_g$) of at least 90° C., and a particle diameter of 100 nm or less; and a binder agent 14 to be applied to at least a portion of a layer of the build material composition 12 via an inkjet printhead to pattern a cross-section of an intermediate part 31. The kit 23 may consist of the build material composition 12 and the binder agent 14 with no other components. The components 12, 14 of the kit may be maintained separately until used together in examples of the 3D printing method disclosed herein.

When used together, the build material composition 12 and the binder agent 14 applied thereto yield a 3D printing composition (not shown). As such, examples of the 3D printing composition disclosed herein include the build material composition 12, and the binder agent 14.

The binder agent 14 in the 3D printing kit 23 may include a binder and a liquid vehicle.

Examples of suitable binders include latexes (i.e., an aqueous dispersion of binder polymer particles), polyvinyl alcohol, polyvinylpyrrolidone, and combinations thereof.

Examples of polyvinyl alcohol include low weight average molecular weight polyvinyl alcohols (e.g., from about 13,000 to about 50,000), such as SELVOL™ PVOH 17 from Sekisui. Examples of polyvinylpyrrolidones include low weight average molecular weight polyvinylpyrrolidones (e.g., from about 15,000 to about 19,000), such as LUVITEC™ K 17 from BASF Corp.

The binder polymer particles may be any latex polymer (i.e., polymer that is capable of being dispersed in an aqueous medium) that is jettable via inkjet printing (e.g., thermal inkjet printing or piezoelectric inkjet printing). In some examples disclosed herein, the binder polymer particles are heteropolymers or co-polymers. The heteropolymers may include a more hydrophobic component and a more hydrophilic component. In these examples, the hydrophilic component renders the particles dispersible in the binder agent 14, while the hydrophobic component is capable of coalescing upon exposure to heat in order to temporarily bind the host metal particles 15.

The binder polymer particles of the latex may have several different morphologies. The binder polymer particles may include two different copolymer compositions, which may be fully separated core-shell polymers, partially occluded mixtures, or intimately comingled as a polymer solution. In an example, the binder polymer particles may be individual spherical particles containing polymer compositions of hydrophilic (hard) component(s) and/or hydrophobic (soft) component(s) that may be interdispersed according to IPN (interpenetrating networks), although it is contemplated that the hydrophilic and hydrophobic components may be interdispersed in other ways. For another example, the binder polymer particles may be made of a hydrophobic core surrounded by a continuous or discontinuous hydrophilic shell. This may lead to good water dispersibility and jetting reliability. For another example, the binder polymer particle morphology may resemble a raspberry, in which a hydrophobic core is surrounded by several smaller hydrophilic particles that are attached to the core. For still another example, the binder polymer particles may include 2, 3, or 4 or more relatively large particles (i.e., lobes) that are at least partially attached to one another or that surround a smaller polymer core. The binder polymer particles may have a single phase morphology, may be partially occluded, may be multiple-lobed, or may include any combination of the morphologies disclosed herein.

The binder polymer particles may have a weight average molecular weight ranging from about 5,000 to about 500,000. As examples, the weight average molecular weight of the latex particles may range from about 10,000 to about 500,000, from about 100,000 to about 500,000, or from about 150,000 to about 300,000.

Binder polymer particles may include a heteropolymer including a hydrophobic component that makes up from about 65% to about 99.9% (by weight) of the heteropolymer, and a hydrophilic component that makes up from about 0.1% to about 35% (by weight) of the heteropolymer. In general, a lower content of the hydrophilic component is associated with easier use of the binder polymer particles under typical ambient conditions. The glass transition temperature of the binder polymer particles may range from about −20° C. to about 130° C., or in a specific example, from about 60° C. to about 105° C. The particle size of the binder polymer particles may range from about 10 nm to about 300 nm.

Examples of monomers that may be used to form the hydrophobic component of the binder polymer particles include $C_4$ to $C_8$ alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), 1,3-butadiene, vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers for the hydrophobic component of the binder polymer particles, or at least one of the previously listed monomers and a hydrophilic monomer, such as an acidic monomer. Examples of acidic monomers that can be polymerized in forming the binder polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of hydrophilic monomers include acrylamide, methacrylamide, monohydroxylated monomers, monoethoxylated monomers, polyhydroxylated monomers, or polyethoxylated monomers.

In an example, the selected monomer(s) is/are polymerized to form a binder polymer particle, which may be a polymer, heteropolymer, or copolymer. In some examples, the monomer(s) are polymerized with a co-polymerizable surfactant. In some examples, the co-polymerizable surfactant can be a polyoxyethylene compound. In some examples, the co-polymerizable surfactant can be a HITENOL® compound e.g., polyoxyethylene alkylphenyl ether ammonium sulfate, sodium polyoxyethylene alkylether sulfuric ester, polyoxyethylene styrenated phenyl ether ammonium sulfate, or mixtures thereof.

The binder polymer particles may have a particle size that can be jetted via thermal inkjet printing or piezoelectric printing or continuous inkjet printing. In an example, the particle size of the binder polymer particles ranges from about 10 nm to about 300 nm.

Any suitable polymerization process may be used to form the binder polymer particles. In examples, the aqueous dispersion of binder polymer particles (latexes) may be produced by emulsion polymerization or co-polymerization of any of the monomers listed for the binder polymer particles.

In an example, the binder polymer particles may be prepared by polymerizing hydrophilic monomers to form the hydrophilic component and attaching the hydrophilic component onto the surface of the hydrophobic component.

In another example, each of the binder polymer particles may be prepared by polymerizing the hydrophobic monomers and the hydrophilic monomers at a ratio of the hydrophobic monomers to the hydrophilic monomers that ranges from 5:95 to 30:70. In this example, the hydrophobic monomers may dissolve in the hydrophilic monomers.

In still another example, each of the binder polymer particles may be prepared by starting the polymerization process with the hydrophobic monomers, then adding the hydrophilic monomers, and then finishing the polymerization process. In this example, the polymerization process may cause a higher concentration of the hydrophilic monomers to polymerize at or near the surface of the hydrophobic component.

In still another example, each of the binder polymer particles may be prepared by starting a copolymerization process with the hydrophobic monomers and the hydrophilic monomers, then adding additional hydrophilic monomers, and then finishing the copolymerization process. In this example, the copolymerization process may cause a higher concentration of the hydrophilic monomers to copolymerize at or near the surface of the hydrophobic component.

Other suitable techniques, specifically for generating a core-shell structure, may be used, such as: i) grafting a hydrophilic shell onto the surface of a hydrophobic core, ii) copolymerizing hydrophobic and hydrophilic monomers using ratios that lead to a more hydrophilic shell, iii) adding hydrophilic monomer (or excess hydrophilic monomer) toward the end of the copolymerization process so there is a higher concentration of hydrophilic monomer copolymerized at or near the surface, or iv) any other method known in the art to generate a more hydrophilic shell relative to the core.

In some examples for forming the binder polymer particles, the hydrophobic monomers are selected from the group consisting of $C_4$ to $C_8$ alkyl acrylate monomers, $C_4$ to $C_8$ alkyl methacrylate monomers, styrene monomers, substituted methyl styrene monomers, vinyl monomers, vinyl ester monomers, and combinations thereof; and the hydrophilic monomers are selected from the group consisting of acidic monomers, unsubstituted amide monomers, alcoholic acrylate monomers, alcoholic methacrylate monomers, $C_1$ to $C_2$ alkyl acrylate monomers, $C_1$ to $C_2$ alkyl methacrylate monomers, and combinations thereof.

The resulting binder polymer particles may exhibit a core-shell structure, a mixed or intermingled polymeric structure, or some other morphology.

In some examples, the binder polymer particles have a MFFT or a glass transition temperature ($T_g$) that is greater (e.g., >) than ambient temperature. In other examples, the binder polymer particles have a MFFT or $T_g$ that is much greater (e.g., >>) than ambient temperature (i.e., at least 15° higher than ambient). As mentioned herein, "ambient temperature" may refer to room temperature (e.g., ranging about 18° C. to about 22° C.), or to the temperature of the environment in which the 3D printing method is performed. Examples of the 3D printing environment ambient temperature may range from about 40° C. to about 50° C. The MFFT or the $T_g$ of the bulk material (e.g., the more hydrophobic portion) of the binder polymer particles may range from 25° C. to about 125° C. In an example, the MFFT or the $T_g$ of the bulk material (e.g., the more hydrophobic portion) of the binder polymer particles is about 40° C. or higher. The MFFT or the $T_g$ of the bulk material may be any temperature above which the polymer particles begin to merge with each other upon contact, thus forming a continuous phase.

The binder polymer particles may have a MFFT or $T_g$ ranging from about 125° C. to about 200° C. In an example, the binder polymer particles may have a MFFT or $T_g$ of about 160° C.

In an example, the binder is present in the binder agent 14 in an amount ranging from about 1 wt % to about 40 wt % based on a total weight of the binder agent. In another example, the binder is present in the binder agent 14 in an amount ranging from about 2 wt % to about 30 wt % based on the total weight of binder agent 14.

In addition to the binder, the binder agent 14 may also include water, co-solvent(s), surfactant(s) and/or dispersing aid(s), antimicrobial agent(s), and/or anti-kogation agent(s).

The co-solvent may be an organic co-solvent present in an amount ranging from about 0.5 wt % to about 40 wt % (based on the total weight of the binder agent 14). It is to be understood that other amounts outside of this range may also be used depending, at least in part, on the jetting architecture used to dispense the binder agent 14. The organic co-solvent may be any water miscible, high-boiling point solvent, which has a boiling point of at least 120° C. Classes of organic co-solvents that may be used include aliphatic alcohols, aromatic alcohols, diols, glycol ethers, polyglycol ethers, 2-pyrrolidones/pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the gas generating liquid functional agent may include 2-pyrrolidone, 2-methyl-1,3-propanediol, 1-(2-hydroxyethyl)-2-pyrrolidone, 1,2-butanediol, or combinations thereof.

The binder agent 14 may also include surfactant(s) and/or dispersing aid(s). Surfactant(s) and/or dispersing aid(s) may be used to improve the wetting properties and the jettability of the binder agent 14. Examples of suitable surfactants and dispersing aids include those that are non-ionic, cationic, or anionic. Examples of suitable surfactants/wetting agents include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously known as ZONYL FSO), and combinations thereof. In a specific example, the surfactant is a non-ionic, ethoxylated acetylenic diol (e.g., SURFYNOL® 465 from Air Products and Chemical Inc.). In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or secondary alcohol ethoxylates (commercially available as TERGITOL® TMN-6, TERGITOL® 15-S-7, TERGITOL® 15-S-9, etc. from The Dow Chemical Co.). In some examples, it may be desirable to utilize a surfactant having a hydrophilic-lipophilic balance (HLB) less than 10. Examples of suitable dispersing aid(s) include those of the SILQUEST™ series from Momentive, including SILQUEST™ A-1230. Whether a single surfactant or dispersing aid is used or a combination of surfactants and/or dispersing aids is used, the total amount of surfactant(s) and/or dispersing aid(s) may range from about 0.01 wt % to about 6 wt % based on the total weight of the binder agent 14.

The binder agent 14 may also include antimicrobial agent(s). Suitable antimicrobial agents include biocides and fungicides. Example antimicrobial agents may include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. In an example, the binder agent 14 may include a total amount of antimicrobial agents that ranges from about 0.1 wt % to about 1 wt %.

An anti-kogation agent may also be included in the binder agent 14. Kogation refers to the deposit of dried solids on a heating element of a thermal inkjet printhead. Anti-kogation agent(s) is/are included to assist in preventing the buildup of kogation, and thus may be included when the binder agent 14 is to be dispensed using a thermal inkjet printhead. Examples of suitable anti-kogation agents include oleth-3-phosphate (commercially available as CRODAFOS™ O3 A or CRODAFOS™ N-3 acid) or dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the binder agent 14 in an amount ranging from about 0.1 wt % to about 1 wt % of the total weight of the binder agent 14.

The balance of the binder agent 14 is water (e.g., deionized water). As such, the amount of water may vary depending upon the weight percent of the other binder agent 14 components.

Figure 5:
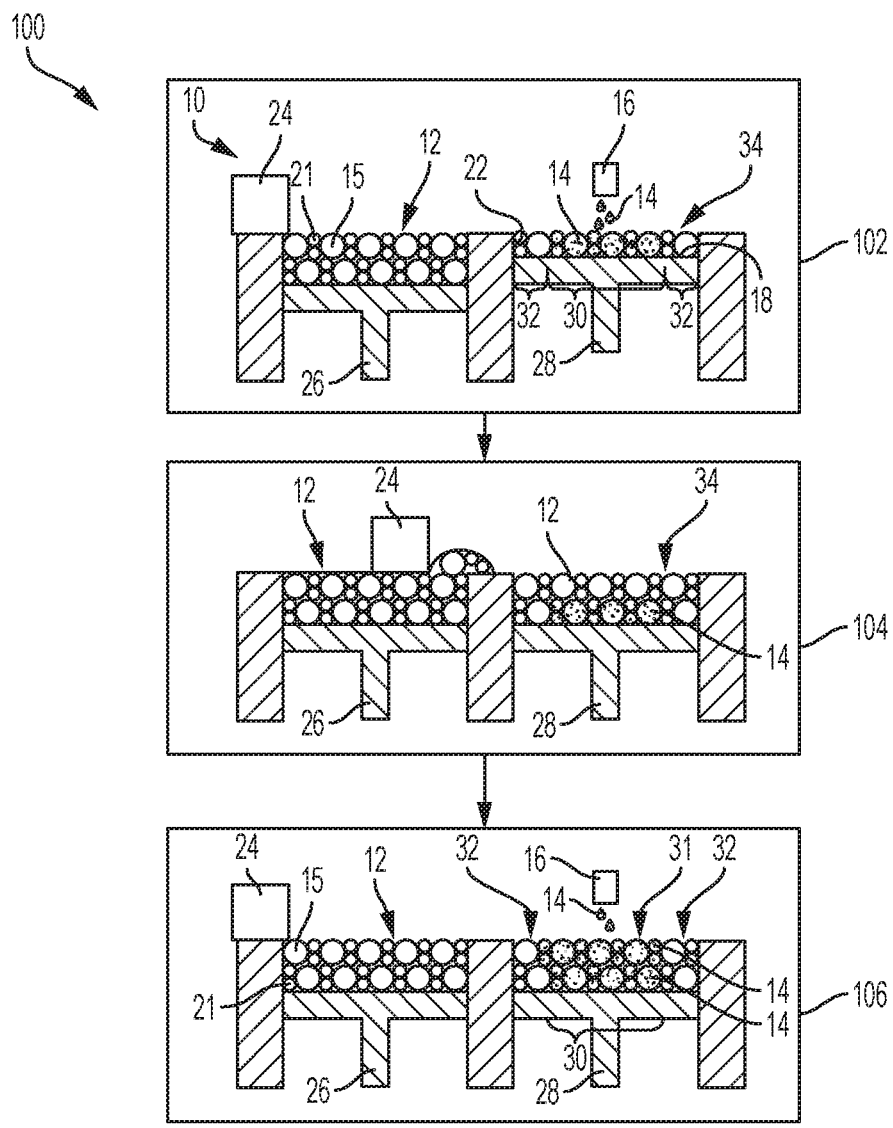
FIG. 5 depicts semi-schematic, partially cross-sectional views illustrating an example of a 3D printing method applying an example of the composition disclosed herein.

Examples of a printing method 100, which include the build material composition 12 and the binder agent 14 are shown in FIG. 5.

As depicted in FIG. 5 at reference numeral 102, a 3D printing system 10 may include an inkjet applicator 16, a supply bed 20 (including a supply of build material composition 12), a delivery piston 26, a spreader 24, a fabrication bed 22, and a fabrication piston 28. The delivery piston 26 and the fabrication piston 28 may be the same type of piston, but are programmed to move in opposite directions. In an example, when a layer of the 3D part 35 is to be formed, the delivery piston 26 may be programmed to push a predetermined amount of the build material composition 12 out of the opening in the supply bed 20 and the fabrication piston 28 may be programmed to move in the opposite direction of the delivery piston 26 in order to increase the depth of the fabrication bed 22. The delivery piston 26 will advance enough so that when the spreader 24 pushes the build material composition 12 into the fabrication bed 22 and onto the build surface 18 or the previously formed layer, the depth of the fabrication bed 22 is sufficient so that a layer 34 of the build material composition 12 and the binder agent 14 may be formed in the fabrication bed 22. The spreader 24 is capable of spreading the build material composition 12 into the fabrication bed 22 to form the build material layer 34, which is relatively uniform in thickness.

In an example, the thickness of the build material layer 34 ranges from about 10 μm to about 70 μm, although thinner or thicker layers may also be used. For example, the thickness of the layer may range from about 20 μm to about 1000 μm. Depending upon the desired thickness for the layer 34 and the particle size(s) within the build material composition 12, the layer 34 that is formed in a single build material application may be made up of a single row of the build material composition 12 or several rows of build material composition 12.

While the system 10 is depicted, it is to be understood that other printing systems 10 may also be used. For example, another support member, such as a build area platform, a platen, a glass plate, or another build surface may be used instead of the fabrication bed 22. The build material composition 12 may be delivered from another source, such as a hopper, an auger conveyer, or the like. It is to be understood that the spreader 24 may be a rigid or flexible blade, which is a more common spreader for metal/metal alloy build materials. However, the spreader may also be replaced by other tools, such as a roller, or a combination of a roller and a blade.

Figure 6:
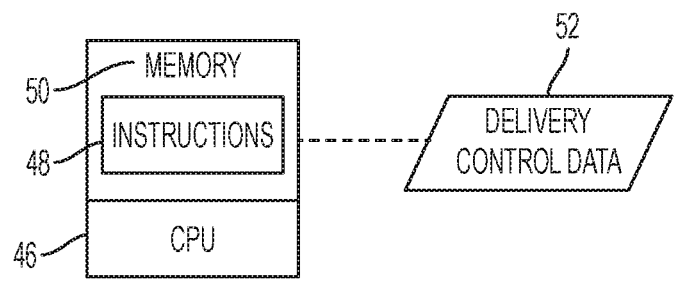
FIG. 6 is a block diagram illustrating a portion of a 3D printing system that can use an example of the composition disclosed herein.

Each of these physical elements of the 3D printing system 10 may be operatively connected to a central processing unit 46 (see FIG. 6) of the 3D printing system 10. The central processing unit 46 (e.g., running computer readable instructions 48 stored on a non-transitory, tangible computer readable storage medium) manipulates and transforms data represented as physical (electronic) quantities within the printer's registers and memories 50 in order to control the physical elements to create the 3D part 35. The data for the selective delivery of the binder agent 14, the build material composition 12, etc. may be derived from a 3D model of the 3D part 35 to be formed. For example, the instructions 48 may cause the controller to utilize an applicator (e.g., an inkjet applicator 16) to selectively dispense the binder agent 14, and to utilize a build material distributor (spreader 24) to dispense the build material composition 12. The central processing unit 46 controls the selective delivery (i.e. dispensing) of the binder agent 14 in accordance with delivery control data 52.

The binder agent 14 may be dispensed from any suitable applicator. As illustrated in FIG. 5 at reference number 102, the binder agent 14 may be dispensed from an inkjet applicator, such as a thermal inkjet printhead or a piezo-electric inkjet printhead. The printhead may be a drop-on-demand printhead or a continuous drop printhead. The inkjet applicator 16 may be selected to deliver drops of binder agent 14 at a resolution ranging from about 300 dots per inch (DPI) to about 1200 DPI. In other examples, the inkjet applicator 16 may be selected to be able to deliver drops of the binder agent 14 at a higher or lower resolution. The drop velocity may range from about 5 m/s to about 24 m/s and the firing frequency may range from about 1 kHz to about 100 kHz. The inkjet applicator 16 may include an array of nozzles through which it is able to selectively eject drops of liquid. In one example, each drop may be on the order of about 5 ng per drop, although it is contemplated that a higher (e.g., 100 ng) or lower (e.g., 1 ng) drop size may be used. In some examples, inkjet applicator 16 is able to deliver variable size drops of the binder agent 14.

The inkjet applicator(s) 16 may be attached to a moving XY stage or a translational carriage (neither of which is shown) that moves the inkjet applicator(s) 16 adjacent to the build surface 18 in order to deposit the binder agent 14 in desirable area(s) 30. In other examples, the applicator(s) 16 may be fixed while a support member (supporting the build surface 18) is configured to move relative thereto.

The inkjet applicator(s) 16 may be programmed to receive commands from the central processing unit 46 and to deposit the binder agent 14 according to a pattern of the layer 34 to be achieved. In an example, a computer model of the part 35 to be printed is generated using a computer aided design (CAD) program. The computer model of the 3D part 35 is sliced into N layers, which are then divided into voxels. The printing parameters for each voxel are computed based on the desired composition and physical properties of the part 35 to be printed. The printing parameters for each voxel may include the X, Y, and Z coordinates that define its location and the amount of the binder agent 14 (if any) that is to be received. The central processing unit 46 may then use this information to instruct the inkjet applicator(s) 16 as to how much (if any) of the binder agent 14 should be jetted into each voxel.

The inkjet applicator 16 selectively applies the binder agent 14 on those portions 30 of the layer 34 of the build material composition 12 that is to form the intermediate part, and ultimately the final 3D part 35. The binder agent 14 may not be applied on the entire layer 34, as shown at the portions 32.

After the binder agent 14 is selectively applied in a pattern on the desired portion(s) 30 of the layer 34 of build material composition 12, another layer of the build material composition 12 is applied, as shown at reference numeral 104 in FIG. 5, and patterned with the binder agent 14, as shown at reference numeral 106. The formation and patterning of additional layers may be repeated in order to form the intermediate part 31.

During and/or after formation of the intermediate part 31, liquid components of the binder agent 14 may be evaporated. Evaporation of the liquid components may be preceded by partial swelling and/or dissolution of polymer binder particles in the liquid solvent phase. Swelling and dissolution of binder particles results in binder polymer chain entanglement and formation of a continuous polymer phase gluing the host metal 15 together. Subsequent evaporation of solvent strengthens binder polymer and improves intermediate part 31 strength.

The intermediate part 31 may be extracted or separated from the non-patterned build material composition 12 (e.g., in portion(s) 32) by any suitable means. In an example, the intermediate part 31 may be extracted by lifting the intermediate part 31 from the non-patterned build material composition 12. Any suitable extraction tool may be used. In some examples, the intermediate part 31 may be cleaned to remove non-patterned build material composition 12 from its surface. In an example, the intermediate part 31 may be cleaned with a brush and/or an air jet, may be exposed to mechanical shaking, or may be exposed to other techniques that can remove the non-patterned build material composition 12.

The intermediate part 31 may then be placed in a heating mechanism (not shown). Examples of the heating mechanism include a furnace or oven, a microwave, or devices capable of hybrid heating (i.e., conventional heating and microwave heating).

The heating mechanism may be used to perform a heating sequence, which involves exposing the intermediate part 31 to a pyrolysis temperature that decomposes the flow additive 21. The heating sequence may form the 3D object 35 (see FIG. 2). In some examples, heating involves exposure to a series of temperatures.

The series of temperatures may involve heating the intermediate structure 31 to a pyrolysis temperature, a de-binding temperature, and then to the sintering temperature. Briefly, the pyrolysis temperature removes the flow additive 21, and the de-binding temperature removes the binder, from the intermediate structure 31 to produce an at least substantially flow additive-free and binder-free intermediate structure 31', and the structure 31' may be sintered to form the final 3D object 35. Heating to pyrolyze, de-bind, and sinter may take place at several different temperatures, where the temperatures for pyrolyzing and de-binding are lower than the temperature(s) for sintering. In some instances, heating to de-bind and heating to pyrolyze may take place at the same temperature or within the same temperature range (e.g., from about 300° C. to about 500° C.).

Heating to pyrolyze is accomplished at a thermal decomposition temperature that is sufficient to thermally decompose the flow additive 21. As such, the temperature for pyrolysis depends upon the flow additive 21 used. In an example, the thermal decomposition temperature ranges from about 250° C. to about 600° C. In another example, the pyrolysis temperature ranges from about 300° C. to about 550° C. The flow additive 21 may have a clean thermal decomposition mechanism (e.g., leaves non-volatile residue in an amount <5 wt % of the initial binder, and in some instances non-volatile residue in an amount <<1 wt % of the initial binder). Since the amount of flow additive 21 in the build material composition 12 is low, any carbon residue that is formed and remains in the part is in a very small amount that does not deleteriously affect the part.

Heating to de-bind is accomplished at a thermal decomposition temperature that is sufficient to thermally decompose the binder. As such, the temperature for de-binding depends upon the binder in the agent 14. In an example, the thermal decomposition temperature ranges from about 250° C. to about 600° C. In another example, the thermal decomposition temperature ranges from about 300° C. to about 550° C. The binder may have a clean thermal decomposition mechanism (e.g., leaves non-volatile residue in an amount <5 wt % of the initial binder, and in some instances non-volatile residue in an amount <<1 wt % of the initial binder). The smaller residue percentage (e.g., close to 0%) is more desirable.

While not being bound to any theory, it is believed that the at least substantially flow additive-free and binder-free intermediate structure 31' may maintain its shape due, for example, to one or more of: i) the low amount of stress experience by the part 31' due to it not being physically handled, and/or ii) low level necking occurring between the host metal particles 15 at the pyrolysis temperature and at the thermal decomposition temperature of the binder. The at least substantially flow additive-free and binder-free intermediate structure 31' may maintain its shape although the binder is at least substantially removed and the host metal particles 15 are not yet sintered.

The temperature may be raised to sinter the substantially flow additive and binder-free intermediate structure 31', which can result in the formation of weak bonds that are strengthened throughout sintering. During sintering, the host metal particles 15 coalesce to form the 3D object 35, and so that a desired density of the 3D object 35 is achieved. The sintering temperature is a temperature that is sufficient to sinter the remaining host metal particles 15. The sintering temperature is highly depending upon the composition of the host metal particles 15. During sintering, the at least substantially flow additive-free and binder-free intermediate structure 31' may be heated to a temperature ranging from about 80% to about 99.9% of the melting point of the host metal particles 15. In another example, the at least substantially flow additive-free and binder-free intermediate structure 31' may be heated to a temperature ranging from about 90% to about 95% of the melting point of the host metal particles 15. In still another example, the at least substantially flow additive-free and binder-free intermediate structure 31' may be heated to a temperature ranging from about 60% to about 90% of the melting point of the host metal particles 15. In still another example, the sintering temperature may range from about 50° C. below the melting temperature of host metal particles 15 to about 200° C. below the melting temperature of the host metal particles 15.

The sintering temperature may also depend upon the particle size and time for sintering (i.e., high temperature exposure time). As an example, the sintering temperature may range from about 500° C. to about 1800° C. In another example, the sintering temperature is at least 900° C. An example of a sintering temperature for bronze is about 850° C., and an example of a sintering temperature for stainless steel is between about 1300° C. and about 1400° C. While these temperatures are provided as sintering temperature examples, it is to be understood that the sintering temperature depends upon the host metal particles 15 that are utilized, and may be higher or lower than the provided examples. Heating at a suitable sintering temperature sinters and coalesces the host metal particles 15 to form a completed 3D object 35. As a result of final sintering, the density may go from 50% density to over 90%, and in some cases very close to 100% of the theoretical density.

The length of time at which the heat (for each of pyrolysis, de-binding, and sintering) is applied and the rate at which the structure 31, 31' is heated may be dependent, for example, on one or more of: characteristics of the heating mechanism, characteristics of the flow additive 21 and binder, characteristics of the host metal particles 15 (e.g., metal type, particle size, etc.), and/or the characteristics of the 3D object/part 46 (e.g., wall thickness).

Heating, respectively, at the pyrolysis and de-binding temperature may occur for a time period ranging from about 10 minutes to about 72 hours. When the structure 31 contains open porosity to vent out binder and/or flow aid 21 pyrolysis, and/or the amount of the binder and/or flow additive 21 is low, and/or the wall thickness of the structure 31 is relatively thin, the time period for de-binding and pyrolysis may be 3 hours (180 minutes) or less. Longer times may be used if the structure 31 has less open porosity, if the structure 31 has thicker walls, and/or if the structure 31 has a higher concentration of binder. In an example, the pyrolysis and de-binding time period is about 60 minutes. In another example, the de-binding time period is about 180 minutes. The intermediate part 31 may be heated to the pyrolysis and/or de-binding temperatures at a heating rate ranging from about 0.5° C./minute to about 20° C./minute. The heating rate (i.e., temperature rise rate) may depend, in part, on one or more of: the amount of the flow additive and/or binder and/or the porosity of the intermediate part 31.

The at least substantially flow additive-free and binder-free intermediate structure 31' may be heated at the sintering temperature for a time period ranging from about 20 minutes to about 15 hours. In an example, the sintering time period is 60 minutes. In another example, the sintering time period is 90 minutes. In still another example, the sintering time period is less than or equal to 3 hours. The at least substantially flow additive-free and binder-free intermediate structure 31' may be heated to the sintering temperature at a heating rate ranging from about 1° C./minute to about 20° C./minute.

While FIG. 5 illustrates one example 3D printing process, it is to be understood that the build material composition 12 may be used in other additive manufacturing processes. An example of another additive manufacturing process is direct metal laser sintering (DMLS). During DMLS, an energy beam is aimed at a selected region (in some instances less than the entire layer) of a layer of the build material composition 12. The energy beam may first applied to cause the flow additive 21 in the build material composition 21 to decompose, and then the intensity may be increased to raise the temperature so that the remaining host metal particles 15, which are exposed to the energy beam, sinter to form the layer of the 3D part. The application of additional build material composition 12 layers and the selective energy beam exposure may be repeated to build up the 3D part layer by layer. In examples that use DMLS, a binder agent 14 may be omitted from the process.

To further illustrate the present disclosure, an example and a prophetic example are given herein. It is to be understood that this example and prophetic example are provided for illustrative purposes and are not to be construed as limiting the scope of the present disclosure.

Example

An example of the organic particle flow additive was prepared according to the following process: A flask was immersed in a water bath and the temperature of the water was raised to 80° C. About 12 grams of sodium dodecyl sulfate and 656 grams of deionized water were charged to the flask. The solution was purged with nitrogen for at least 30 minutes. About 108 grams of isobornyl methacrylate and about 12 grams of ethyleneglycol dimethacrylate were mixed in a beaker to form a monomer mixture. 10% of the monomer mixture was added to the flask to form a monomer emulsion. About 3 grams of 10% sodium persulfate was added to initiate the polymerization for 15 minutes. The remaining monomer mixture was pumped into the flask over a 90 minutes time period. About 3 grams of 10% sodium persulfate was added every 30 minutes. The polymerization was continued for two more hours after the addition of monomer mixture. The dispersion was cooled to 30° C. and filtered through a 400 mesh stainless steel sieve. The obtained organic particles had an average particle radius of 34 nm (volume weighted mean diameter of about 68 nm) and the total solids content of the dispersion was 15.2%.

To form examples of the build material composition, different amounts of the organic particle flow additive were mixed with a host metal, i.e., stainless steel, 316, grade −22 μm (80%) powder from "Sandvik", (volume weighted mean diameter was about 11 μm). The different amounts included 0.02 wt % organic particles with the 316L host metal powder, 0.05 wt % organic particles with the 316L host metal powder, 0.1 wt % organic particles with the 316L host metal powder, and 0.2 wt % organic particles with the 316L host metal powder.

To form comparative example build material compositions, different amounts the silica flow aid (i.e., Aerosil R812, available from Evonik) was mixed with the same host metal. The different amounts included, 0.02 wt % silica flow aid with the 316L host metal powder, 0.05 wt % silica flow aid with the 316L host metal powder, 0.1 wt % silica flow aid with the 316L host metal powder, and 0.2 wt % silica flow aid with the 316L host metal powder.

As a baseline, the stainless steel host metal powder was also used without any flow additive.

The examples and comparative examples were blended via rolling powder mixes in plastic containers for about 2 hours. The flowability of the baseline, the examples, and the comparative examples was characterized by measuring its Hausner Ratio utilizing a Granupack tap density tester (available from Granutools).

Figure 7:
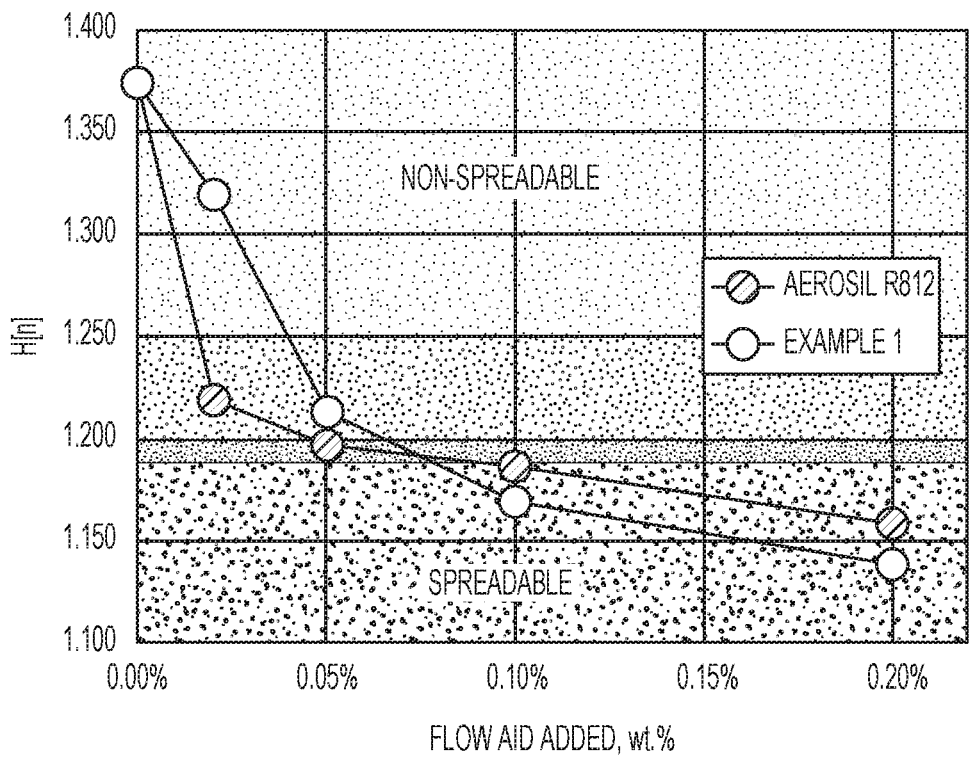
FIG. 7 is a graph depicting Hausner Ratio as a function of flow aid weight percentage for an example of the composition disclosed herein and for the mixture of the comparative fumed silica flow aid in 316L stainless steel powder.

The results for the baseline, the examples and comparative examples are shown in FIG. 7. As shown in FIG. 7, the baseline (i.e., host metal powder without any flow additive) had very poor flow behavior, and it was impossible to spread into uniform thin layers. Both the comparative examples and the examples performed better in terms of spreadability than the baseline.

As shown in FIG. 7, the example composition with 0.05 wt % of the crosslinked organic particle flow additives had a Hausner Ratio of about 1.21, which was marginally spreadable. However, the example compositions with 0.1 wt % and 0.2 wt % of the crosslinked organic particle flow additives were spreadable, and performed better than both the baseline and the comparative examples with the silica flow aid. As shown in FIG. 7, the example build material composition with 0.1 wt % of the crosslinked organic particle flow aid had a Hausner Ratio of about 1.17 and was lower than the comparative build material composition having the same amount of the silica flow aid. Also as shown in FIG. 7, the build material composition with 0.2 wt % of the crosslinked organic particle flow aid had a Hausner Ratio of about 1.14 and was lower than the comparative build material composition having the same amount of the silica flow aid.

Figure 8:
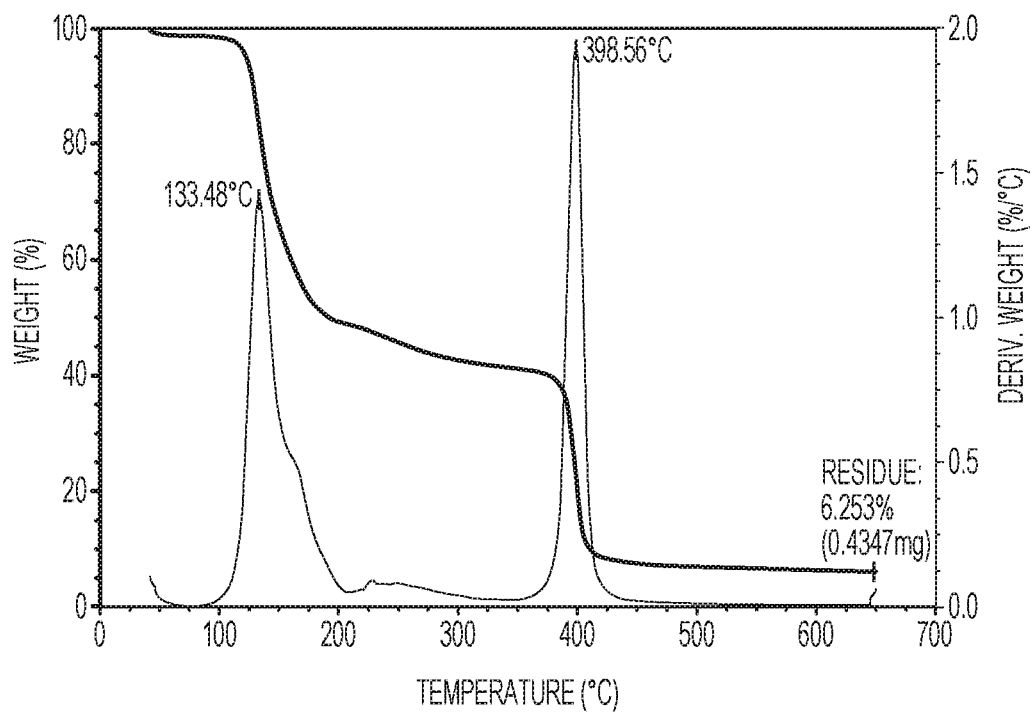
FIG. 8 is a Thermogravimetric Analysis (TGA) trace depicting test results of pyrolysis of a test sample of a build material composition as disclosed herein.

FIG. 8 is a Thermogravimetric Analysis (TGA) trace depicting pyrolysis of a sample of the crosslinked organic particles described in this example. The sample was heated up to 650° C. at a rate of 10° C./minute in an $N_2$ atmosphere. As depicted in FIG. 8, most of the mass of crosslinked organic particles was removed below 500° C. The volatile decomposition product(s) produced by pyrolysis of the crosslinked organic particles was about 94 wt % of the starting material, and the non-volatile carbon-rich residue produced by pyrolysis of the crosslinked organic particles was about 6.253 wt % of the starting material.

Prophetic Example

To form another example of the build material composition, the organic particle flow additive of example 1 can be mixed with a nickel alloy host metal. The amount of the organic particle can range from about 0.05 wt % to about 0.1 wt %. It is believed that the Hausner ratio of this build material composition will be below 1.2.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range, as if the value(s) or sub-range(s) within the stated range were explicitly recited. For example, a range from about 95 weight percent to about 99.99 weight percent should be interpreted to include the explicitly recited limits of about 95 weight percent to about 99.99 weight percent, as well as individual values, such as 95.73 weight percent, 96 weight percent, 97.2 weight percent, etc., and sub-ranges, such as from about 95.25 weight percent to about 99.25 weight percent, from about 96 weight percent to about 98.75 weight percent, etc. Furthermore, when "about" is utilized to describe a value, this is meant to encompass minor variations (up to +/−10%) from the stated value. As used herein, the term "few" means about three.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A build material composition for three-dimensional (3D) printing, the build material composition comprising:
    host metal particles having an average particle size ranging from about 1 μm to less than 20 μm and present in an amount of from about 90 wt % to about 99.99 wt %, based on a total weight of the build material composition; and
    a flow additive present in an amount of from about 0.01 wt % to about 10 wt % based on the total weight of the build material composition, wherein the flow additive consists of discrete organic particles each having crosslinked polymer chains, a glass transition temperature ($T_g$) of at least 90° C., and a primary particle diameter of 100 nm or less;
    wherein the discrete organic particles of the flow additive do not adhere to the host metal particles.

2. The build material composition as defined in claim 1 wherein the build material composition is spreadable, having a Hausner Ratio less than 1.2.

3. The build material composition as defined in claim 1 wherein the crosslinked polymer chains are formed of:
    a hydrophobic monomer having a $T_g$ of equal to or greater than 90° C. and water solubility lower than 0.1%; and
    a multi-functional crosslinking monomer.

4. The build material composition as defined in claim 3 wherein each of the discrete organic particles includes:
    from about 80 wt % to about 98 wt % of the hydrophobic monomer based on a total weight of the organic particle; and
    from about 2 wt % to about 20 wt % of the multi-functional crosslinking monomer based on a total weight of the organic particle.

5. The build material composition as defined in claim 3 wherein:
    the hydrophobic monomer is selected from the group consisting of isobornyl methacrylate, isobornyl acrylate, tert-butyl methacrylate, tert-butyl acrylamide, tert-butyl methacrylamide, N-phenylacrylamide, N-benzyl-methacrylamide, N-tert-octylacrylamide, cyclohexylmethacrylate, 4-tert-butylcyclohexyl methacrylate, benzhydryl methacrylate, methyl methacrylate, phenyl methacrylate, dihydrodicyclopentadienyl acrylate, 4-tert-butylstyrene, 2,6-dichlorostyrene, 2,5-dimethylstyrene, 4-methylstyrene, 3-methylstyrene, styrene, 2,4,6-trimethylstyrene, 4-acetoxystyrene, and combinations thereof; and
    the multi-functional crosslinking monomer is selected from the group consisting of ethylene glycol dimethacrylate, ethylene glycol diacrylate, diethylene glycol dimethacrylate, diethylene glycol diacrylate, 1,4-butanediol diacrylate, 1,3-butanediol dimethacrylate, 1,4-butanediol dimethacrylate, 1,6-hexanediol diacrylate, 1,6-hexanediol dimethacrylate, N—N'-hexamethylen-ebisacrylamide, triethylene glycol dimethacrylate, zinc methacrylate, pentaerythritol tetraacrylate, pentaerythritol triacrylate, N—N'-ethylenebisacrylamide, N—N'-methylenebisacrylamide, 1,4-divinylbenzene, 1,3-divinylbenzene, and combinations thereof.

6. The build material composition as defined in claim 3 wherein the crosslinked polymer chains are further formed of a low $T_g$ monomer having a $T_g$ less than 90° C.

7. The build material composition as defined in claim 6 wherein each of the discrete organic particles includes:
    from about 55 wt % to about 95 wt % of the hydrophobic monomer;
    from about 5 wt % to about 40 wt % of the multi-functional crosslinking monomer; and
    up to about 10 wt % of the low $T_g$ monomer.

8. The build material composition as defined in claim 6 wherein:
    the hydrophobic monomer is selected from the group consisting of isobornyl methacrylate, isobornyl acrylate, tert-butyl methacrylate, tert-butyl acrylamide, tert-butyl methacrylamide, N-phenylacrylamide, N-benzyl-methacrylamide, N-tert-octylacrylamide, cyclohexylmethacrylate, 4-tert-butylcyclohexyl methacrylate, benzhydryl methacrylate, methyl methacrylate, phenyl methacrylate, dihydrodicyclopentadienyl acrylate, 4-tert-butylstyrene, 2,6-dichlorostyrene, 2,5-dimethylstyrene, 4-methylstyrene, 3-methylstyrene, styrene, 2,4,6-trimethylstyrene, 4-acetoxystyrene, and combinations thereof;
    the multi-functional crosslinking monomer is selected from the group consisting of ethylene glycol dimethacrylate, ethylene glycol diacrylate, diethylene glycol dimethacrylate, diethylene glycol diacrylate, 1,4-butanediol diacrylate, 1,3-butanediol dimethacrylate, 1,4-butanediol dimethacrylate, 1,6-hexanediol diacrylate, 1,6-hexanediol dimethacrylate, N—N'-hexamethylen-ebisacrylamide, triethylene glycol dimethacrylate, zinc methacrylate, pentaerythritol tetraacrylate, pentaerythritol triacrylate, N—N'-ethylenebisacrylamide, N—N'-methylenebisacrylamide, 1,4-divinylbenzene, 1,3-divinylbenzene, and combinations thereof; and
    the low $T_g$ monomer is selected from the group consisting of n-butyl acrylate, n-butyl methacrylate, 2-ethylhexyl acrylate, ethyl acrylate, n-propyl acrylate, benzyl acrylate, and combinations thereof.

9. The build material composition as defined in claim 3 wherein the crosslinked polymer chains are further formed of an acidic monomer selected from the group consisting of 2-acrylamido-2-methy-1-propanesulfonic acid, methacrylic acid, and combinations thereof.

10. The build material composition as defined in claim 1 wherein each of the discrete organic particles has a degree of crosslinking of at least 2%.

11. The build material composition as defined in claim 1 wherein the flow additive is pyrolyzable at a pyrolysis temperature that is less than a sintering temperature of the host metal particles, wherein the sintering temperature ranges from about 500° C. to about 1800° C.

12. The build material composition as defined in claim 1 wherein the discrete organic particles of the flow additive are hydrophobic.

13. A three-dimensional (3D) printing kit, comprising:
a build material composition, including:
host metal particles having an average particle size ranging from about 1 μm to less than 20 μm and present in an amount of from about 90 wt % to about 99.99 wt %, based on a total weight of the build material composition; and
a flow additive present in an amount of from about 0.01 wt % to about 10 wt % based on the total weight of the build material composition, wherein the flow additive consists of discrete organic particles each having crosslinked polymer chains, a glass transition temperature ($T_g$) of at least 90° C., and a primary particle diameter of 100 nm or less,
wherein the discrete organic particles of the flow additive do not adhere to the host metal particles; and
a binder agent to be applied to at least a portion of a layer of the build material composition via an inkjet printhead to pattern a cross-section of an intermediate part.

14. The 3D printing kit as defined in claim 13 wherein the build material composition is spreadable, having a Hausner Ratio less than 1.25.

15. A method for making a three-dimensional printing build material composition, comprising:
co-polymerizing a hydrophobic monomer having a glass transition temperature ($T_g$) of equal to or greater than 90° C. and water solubility lower than 0.1% and a multi-functional crosslinking monomer to form discrete organic particles each having crosslinked polymer chains, a glass transition temperature ($T_g$) of at least 90° C., and a primary particle diameter of 100 nm or less in a dispersion;
separating the discrete organic particles from the dispersion to form a flow additive consisting of the discrete organic particles; and
combining host metal particles and the flow additive to form a build material mixture, the host metal particles having an average particle size ranging from about 1 μm to less than 20 lam and being present in an amount of from about 90 wt % to about 99.99 wt % based on a total weight of the build material mixture and the flow additive being present in an amount of from about 0.01 wt % to about 10 wt % based on the total weight of the build material mixture,
wherein the discrete organic particles do not adhere to the host metal particles.

16. The method as defined in claim 15 wherein prior to co-polymerizing, the method further comprises combining the hydrophobic monomer and the multi-functional crosslinking monomer in a mixture including water, an initiator, and a surfactant.

17. A method for three-dimensional (3D) printing, comprising:
spreading a build material composition to form individual layers, the build material composition comprising:
host metal particles having an average particle size ranging from about 1 μm to less than 20 μm and present in an amount of from about 90 wt % to about 99.99 wt %, based on a total weight of the build material composition; and
a flow additive present in an amount of from about 0.01 wt % to about 10 wt % based on the total weight of the build material composition, wherein the flow additive consists of discrete organic particles each having crosslinked polymer chains, a glass transition temperature ($T_g$) of at least 90° C., and a primary particle diameter of 100 nm or less,
wherein the discrete organic particles of the flow additive do not adhere to the host metal particles;
iteratively patterning the individual layers with a binding agent to form an intermediate structure; and
heating the intermediate structure to form a 3D object.

* * * * *